(12) United States Patent
Noguchi

(10) Patent No.: US 9,139,195 B2
(45) Date of Patent: Sep. 22, 2015

(54) VEHICLE DRIVE DEVICE

(71) Applicant: HONDA MOTOR CO., LTD., Minato-ku, Tokyo (JP)

(72) Inventor: Masatoshi Noguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 225 days.

(21) Appl. No.: 13/853,554

(22) Filed: Mar. 29, 2013

(65) Prior Publication Data

US 2013/0261863 A1 Oct. 3, 2013

(30) Foreign Application Priority Data

Mar. 30, 2012 (JP) .................................. 2012-082939

(51) Int. Cl.
*B60L 9/00* (2006.01)
*B60L 11/00* (2006.01)
(Continued)

(52) U.S. Cl.
CPC .................. *B60W 20/00* (2013.01); *B60K 1/02* (2013.01); *B60K 6/52* (2013.01); *B60K 7/0007* (2013.01); *B60K 17/046* (2013.01);
(Continued)

(58) Field of Classification Search
CPC ............ B60K 1/00; B60K 6/00; B60K 6/365; B60K 6/387; B60K 6/44; B60K 6/442; B60K 17/354; B60K 23/0808; B60K 2023/0858
USPC .......... 701/22, 48, 70, 71, 81; 180/6.28, 6.48, 180/6.5, 65.21, 65.225, 65.285, 243, 248, 180/249, 308; 903/911, 947
See application file for complete search history.

(56) References Cited

U.S. PATENT DOCUMENTS 6,024,182 A * 2/2000 Hamada et al. ............... 180/6.28
6,105,704 A * 8/2000 Hamada et al. ............... 180/248
(Continued)

FOREIGN PATENT DOCUMENTS

| CN | 101678776 A | 3/2010 |
| JP | 3138799 B2 | 2/2001 |

(Continued)

OTHER PUBLICATIONS

Office Action dated May 6, 2015, issued in corresponding Chinese Patent Application No. 201310103476.3, with English partial translation (9 pages).

*Primary Examiner* — Dalena Tran
*Assistant Examiner* — Jaime Figueroa
(74) *Attorney, Agent, or Firm* — Westerman, Hattori, Daniels & Adrian, LLP

(57) ABSTRACT

An electric motor-generator controller (8) is configured to control a left electric power of the left electric motor-generator (2A) and a right electric power of the right electric motor-generator (2B), based on the sum of the left electric power and the right electric power, wherein the left electric power is defined as an electric power generated or consumed by the left electric motor-generator (2A) and, the right electric power is defined as an electric power generated or consumed by the right electric motor-generator (2B). The electric motor-generator controller (8) control the left electric power of the left electric motor-generator and the right electric power of the right electric motor-generator such that the sum of the left electric power and the right electric power becomes a constant value, when the rotation restrictor controller (8) controls the rotation restrictor (60A, 60B) such that the rotation restrictor releases the third rotation elements.

10 Claims, 14 Drawing Sheets

(51) Int. Cl.
  *G05D 1/00*    (2006.01)
  *G05D 3/00*    (2006.01)
  *G06F 7/00*    (2006.01)
  *G06F 17/00*   (2006.01)
  *B60W 20/00*   (2006.01)
  *B60W 10/08*   (2006.01)
  *B60W 10/10*   (2012.01)
  *B60K 1/02*    (2006.01)
  *B60K 6/52*    (2007.10)
  *B60K 7/00*    (2006.01)
  *B60K 17/04*   (2006.01)
  *B60W 30/18*   (2012.01)
  *B60K 17/356*  (2006.01)
  *B60K 6/38*    (2007.10)

(52) U.S. Cl.
  CPC .............. *B60K 17/356* (2013.01); *B60W 10/08* (2013.01); *B60W 10/10* (2013.01); *B60W 30/18145* (2013.01); *B60K 2006/381* (2013.01); *B60K 2007/0092* (2013.01); *B60W 2600/00* (2013.01); *B60W 2710/086* (2013.01); *B60W 2720/14* (2013.01); *Y02T 10/6265* (2013.01); *Y02T 10/7258* (2013.01); *Y10S 903/93* (2013.01)

(56) References Cited

U.S. PATENT DOCUMENTS

| | | | | |
|---|---|---|---|---|
| 6,110,066 | A  * | 8/2000  | Nedungadi et al. | 475/5 |
| 6,278,915 | B1 * | 8/2001  | Deguchi et al.   | 701/22 |
| 6,321,865 | B1 * | 11/2001 | Kuribayashi et al. | 180/243 |
| 6,325,736 | B1 * | 12/2001 | Hamada et al.    | 475/18 |
| 8,177,007 | B2 * | 5/2012  | Abe et al.       | 180/65.285 |
| 2004/0050598 | A1 * | 3/2004  | Saito et al.  | 180/65.2 |
| 2004/0200654 | A1 * | 10/2004 | Hatsuda et al. | 180/243 |
| 2005/0103551 | A1 * | 5/2005  | Matsuno       | 180/243 |
| 2005/0252703 | A1   | 11/2005 | Schmidt et al. | |
| 2009/0038866 | A1 * | 2/2009  | Abe et al.    | 180/65.7 |
| 2009/0088914 | A1 * | 4/2009  | Mizutani et al. | 701/22 |
| 2010/0298092 | A1 * | 11/2010 | Tsuchikawa    | 477/71 |
| 2011/0239801 | A1 * | 10/2011 | Inagaki et al. | 74/473.1 |
| 2011/0246041 | A1 * | 10/2011 | Kato          | 701/70 |

FOREIGN PATENT DOCUMENTS

| | | |
|---|---|---|
| JP | 2007-15485 A  | 1/2007 |
| JP | 2009-68624 A  | 4/2009 |
| JP | 2009-120039 A | 6/2009 |

\* cited by examiner

<RING-FREE ELECTRIC POWER PRIORITY CONTROL>

VEHICLE DRIVE DEVICE

CROSS-REFERENCE TO RELATED APPLICATION

This application claims priority from Japanese Patent Applications No. 2012-082939, filed on Mar. 30, 2012, the entire contents of which are herein incorporated by reference.

BACKGROUND

1. Technical Field

The present invention relates to a vehicle drive device provided with a left wheel drive unit for driving a left wheel and a right wheel drive unit for driving a right wheel.

2. Description of the Related Art

In Japanese Patent No. 3138799, a vehicle drive device is described which is equipped with a left wheel drive unit having a first electric motor for driving a left wheel of a vehicle and a first planetary gear transmission provided on the power transmission path between the first electric motor and the left wheel, and also equipped with a right wheel drive unit having a second electric motor for driving a right wheel of the vehicle and a second planetary gear transmission provided on the power transmission path between the second electric motor and the right wheel. In the first and second planetary gear transmissions, the first and second electric motors are respectively connected to the sun gears thereof, the left wheel and the right wheel are respectively connected to the planetary carriers thereof, and the ring gears thereof are connected to each other. Furthermore, the vehicle drive device is provided with braking means for braking the rotation of the ring gears by releasing or engaging the connected ring gears.

In the vehicle drive device configured as described above, it is described that start assist control is performed at the time of vehicle start by engaging braking means. Furthermore, it is also described that torque control is performed so that the torques generated by the first and second electric motors have directions opposite to each other with the braking means released after the start, whereby even when a yaw moment is exerted to the vehicle due to disturbance or the like, a moment opposed to this yaw moment is generated, and the straight traveling stability and the turning stability of the vehicle are improved.

In the vehicle drive device described in Japanese Patent No. 3138799, however, nothing is described about how to control the electric power of an electric power source for supplying electric power to the first and second electric motors at the time when the yaw moment is generated. Hence, the vehicle drive device has room for improvement in electric power saving and in countermeasures for problems occurred in the electric power source.

SUMMARY OF THE INVENTION

It is one of objects of the present invention to provide a vehicle drive device excellent in controllability by additionally considering matters relating to electric power.

According to a first aspect of the present invention, there is provide a vehicle drive device (for example, a rear wheel drive unit 1 according to an embodiment described later) comprising:

a left electric motor-generator (for example, a first electric motor 2A according to the embodiment described later) connected to a left wheel (for example, a left rear wheel LWr according to the embodiment described later) of a vehicle;

a left speed changer (for example, a first planetary gear reducer 12A according to the embodiment described later) disposed on a power transmission path between the left wheel and the left electric motor-generator;

a right electric motor-generator (for example, a second electric motor 2B according to the embodiment described later) connected to a right wheel (for example, a right rear wheel RWr according to the embodiment described later) of the vehicle;

a right speed changer (for example, a second planetary gear reducer 12B according to the embodiment described later) disposed on a power transmission path between the right wheel and the right electric motor-generator; and an electric motor-generator controller (for example, a controller 8 according to the embodiment described later) configured to control the left electric motor-generator and the right electric motor-generator, wherein each of the left speed changer and the right speed changer comprises first to third rotation elements, the left electric motor-generator is connected to the first rotation element (for example, a sun gear 21A according to the embodiment described later) of the left speed changer, the right electric motor-generator is connected to the first rotation element (for example, a sun gear 21B according to the embodiment described later) of the right speed changer, the left wheel is connected to the second rotation element (for example, a planetary carrier 23A according to the embodiment described later) of the left speed changer, the right wheel is connected to the second rotation element (for example, a planetary carrier 23B according to the embodiment described later) of the right speed changer, and the third rotation element (for example, a ring gear 24A according to the embodiment described later) of the left speed changer and the third rotation element (for example, a ring gear 24B according to the embodiment described later) of the right speed changer are connected to each other, the vehicle drive device further comprises:

a rotation restrictor (for example, hydraulic brakes 60A and 60B according to the embodiment described later) configured to switched to be in a released state or a locked state and configured to restrict rotations of the third rotation elements in the locked state, and a rotation restrictor controller (for example, the controller 8 according to the embodiment described later) configured to control the rotation restrictor, wherein the electric motor-generator controller is configured to control a left electric power of the left electric motor-generator and a right electric power of the right electric motor-generator, based on the sum of the left electric power and the right electric power, wherein the left electric power is defined as an electric power generated or consumed by the left electric motor-generator and, the right electric power is defined as an electric power generated or consumed by the right electric motor-generator, and wherein the electric motor-generator controller control the left electric power of the left electric motor-generator and the right electric power of the right electric motor-generator such that the sum of the left electric power and the right electric power becomes a constant value, when the rotation restrictor controller controls the rotation restrictor such that the rotation restrictor is in the released state.

According to a second aspect of the present invention, the electric motor-generator controller is further configured to control a first difference between a torque of the left electric motor-generator (for example, a first motor torque $TM1q$ according to the embodiment described later) and a torque of the right electric motor-generator (for example, a second motor torque TM2q according to the embodiment described later) or a second difference between a drive power of the left electric motor-generator and a drive power of the right electric motor-generator. The electric motor-generator controller controls the first difference or the second difference such that the first difference or the second difference becomes a constant value, when the rotation restrictor controller controls the rotation restrictor such that the rotation restrictor is in the released state.

According to a third aspect of the present invention, the vehicle drive device further comprises a third rotation element state amount obtaining unit configured to obtain a rotation state amount of the third rotation elements, wherein the electric motor-generator controller stops controlling the left electric power of the left electric motor-generator and the right electric power of the right electric motor-generator, when the rotation state amount of the third rotation elements is equal to or more than a predetermined value.

According to a fourth aspect of the present invention, the vehicle drive device further comprises a rotation state amount obtaining unit (for example, resolvers 20A and 20B according to the embodiment described later) configured to obtain a rotation state amount of the left electric motor-generator, the first rotation element of the left speed changer, the right electric motor-generator or the first rotation element of the right speed changer. The electric motor-generator controller stops controlling the left electric power of the left electric motor-generator and the right electric power of the right electric motor-generator, when the rotation state amount obtained by the rotation state amount obtaining unit is equal to or more than a predetermined value.

According to a fifth aspect of the present invention, the constant value is substantially zero.

According to a sixth aspect of the present invention, there is provided a vehicle drive device (for example, a rear wheel drive unit 1 according to an embodiment described later) comprising:

a left electric motor-generator (for example, a first electric motor 2A according to the embodiment described later) connected to a left wheel (for example, a left rear wheel LWr according to the embodiment described later) of a vehicle;

a left speed changer (for example, a first planetary gear reducer 12A according to the embodiment described later) disposed on a power transmission path between the left wheel and the left electric motor-generator;

a right electric motor-generator (for example, a second electric motor 2B according to the embodiment described later) connected to a right wheel (for example, a right rear wheel RWr according to the embodiment described later) of the vehicle;

a right speed changer (for example, a second planetary gear reducer 12B according to the embodiment described later) disposed on a power transmission path between the right wheel and the right electric motor-generator; and an electric motor-generator controller (for example, a controller 8 according to the embodiment described later) configured to control the left electric motor-generator and the right electric motor-generator, wherein each of the left speed changer and the right speed changer comprises first to third rotation elements, the left electric motor-generator is connected to the first rotation element (for example, a sun gear 21A according to the embodiment described later) of the left speed changer, the right electric motor-generator is connected to the first rotation element (for example, a sun gear 21B according to the embodiment described later) of the right speed changer, the left wheel is connected to the second rotation element (for example, a planetary carrier 23A according to the embodiment described later) of the left speed changer, the right wheel is connected to the second rotation element (for example, a planetary carrier 23B according to the embodiment described later) of the right speed changer, and the third rotation element (for example, a ring gear 24A according to the embodiment described later) of the left speed changer and the third rotation element (for example, a ring gear 24B according to the embodiment described later) of the right speed changer are connected to each other, the vehicle drive device further comprises:

a rotation restrictor (for example, hydraulic brakes 60A and 60B according to the embodiment described later) switched to be in a released state or in a locked state and configured to restrict rotations of the third rotation elements in the locked state; and a rotation restrictor controller (for example, the controller 8 according to the embodiment described later) configured to control the rotation restrictor, wherein the electric motor-generator controller is configured to control a left electric power of the left electric motor-generator and a right electric power of the right electric motor-generator, based on the sum of the left electric power and the right electric power, wherein the left electric power is defined as an electric power generated or consumed by the left electric motor-generator, and the right electric power is defined as an electric power generated or consumed by the right electric motor-generator, wherein the electric motor-generator controller is further configured to control a first difference between a torque of the left electric motor-generator and a torque of the right electric motor-generator or a second difference between a drive power of the left electric motor-generator and a drive power of the right electric motor-generator, wherein in a state where the rotation restrictor controller controls the rotation restrictor such that the rotation restrictor is in the locked state, and the electric motor-generator controller controls the left electric power of the left electric motor-generator and the right electric power of the right electric motor-generator such that the sum of the left electric power and the right electric power is substantially zero while controlling the first difference or the second difference such that the first difference or the second difference becomes a constant value, when a torque or a drive power being equal to or more than a grip limit is generated or predicted to be generated at either the left wheel or the right wheel, the rotation restrictor controller controls the rotation restrictor such that the rotation restrictor is switched from the locked state to the released state, and the electric motor-generator controller controls the left electric power of the left electric motor-generator and the right electric power of the right electric motor-generator such that the sum of the left electric power and the right electric power maintains substantially zero while controlling the first difference or the second difference such that the first difference or the second difference maintains the constant value.

According to the first aspect of the present invention, although it is usually impossible to transmit the torques of the electric motor-generators to the wheels at the time when the rotation restrictor disposed on the power transmission path between the wheels and the electric motor-generators is released, the third rotation elements of the left and right speed changers are connected to each other, whereby only amounts being equal to each other in absolute value but opposite in direction can be transmitted to the wheels. Furthermore, the left-right electric power sum is controlled to a constant value in this state, whereby the load fluctuations of an electric power source for supplying electric power to the left and right electric motor-generators can be suppressed.

According to the second aspect of the present invention, although the left-right difference changes in some cases even if the left-right electric power sum is constant, control is performed so that the left-right difference becomes constant, whereby the change in a yaw moment due to the left-right difference can be suppressed.

According to the third aspect of the present invention, although the balance between the left and right torques is lost and the rotation speed of the third rotation elements is increased in some cases when the electric power control is performed so that the electric power sum becomes constant, the electric power control is stopped when the rotation state amount of the third rotation elements is equal to or more than the predetermined value, whereby the third rotation elements are suppressed from rotating at over speed.

According to the fourth aspect of the present invention, although the balance between the left and right torques is lost and the rotation speeds of the left and right electric motor-generators and the first rotation elements are decreased in some cases when the electric power control is performed so that the electric power sum becomes constant, the electric power control is stopped when the rotation state amounts thereof become equal to or less than the predetermined value, whereby the electric power control can be performed in an appropriate range.

According to the fifth aspect of the present invention, the electric power balance between the left electric power and the right electric power can be set to nearly zero, whereby the load fluctuations of the electric power source for supplying electric power to the left and right electric motor-generators can be suppressed. In addition, torques can be transmitted to the wheels even in a state in which the function of the electric power source is more degraded than usual, for example, because of extremely-low temperature or due to problems in the electric power source.

According to the sixth aspect of the present invention, although it is usually impossible to transmit the torques of the electric motor-generators to the wheels at the time when the rotation restrictor disposed on the power transmission path between the wheels and the electric motor-generators is released, the third rotation elements of the left and right speed changers are connected to each other, whereby only amounts being equal to each other in absolute value but opposite in direction can be transmitted to the wheels. Furthermore, the left-right electric power sum is controlled to a constant value in this state, whereby the load fluctuations of an electric power source for supplying electric power to the left and right electric motor-generators can be suppressed.

Moreover, in the case that a torque or a drive force being equal to or more than the grip limit is generated or predicted to be generated in either the left wheel or the right wheel in the engaged state of the rotation restrictor, the rotation restrictor is switched to its released state, whereby the period in which the left-right electric power sum is zero can be maintained longer while slip generation is suppressed.

DETAILED DESCRIPTION OF EXEMPLARY EMBODIMENTS

First, an embodiment of a vehicle drive device according to the present invention will be described based on FIGS. 1 to 3.

Figure 1:
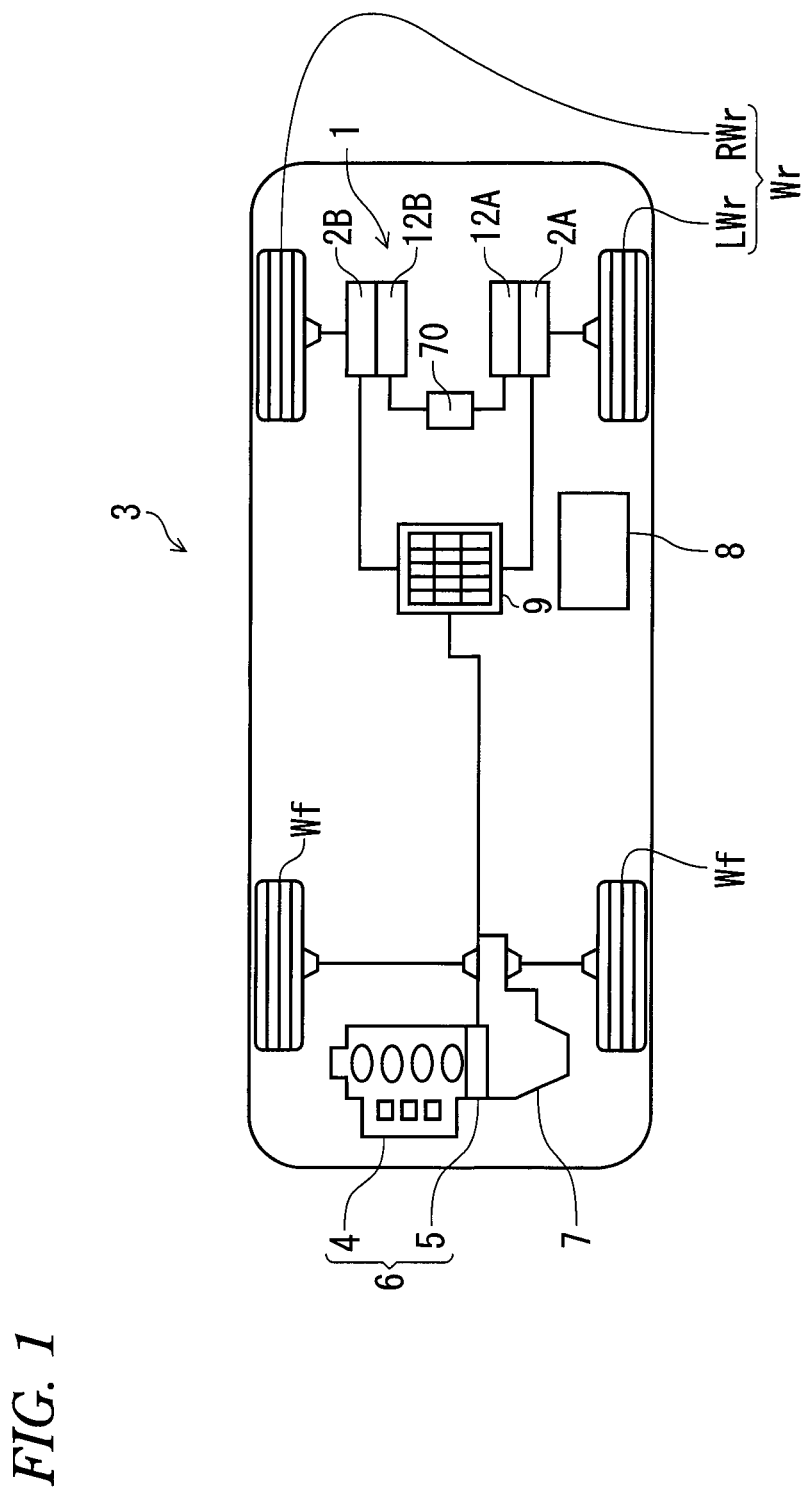
FIG. 1 is a block diagram showing a schematic configuration of a hybrid vehicle according to an embodiment of a vehicle on which a vehicle drive device according to the present invention can be mounted.

The vehicle drive device according to the present invention, in which electric motors serve as drive sources for driving axles, is used for a vehicle having such a drive system shown in FIG. 1, for example. In the following descriptions, a case in which the vehicle drive device is used to drive rear wheels is taken as an example. However, the vehicle drive device may also be used to drive front wheels.

The vehicle 3 shown in FIG. 1 is a hybrid vehicle having a drive unit 6 (hereafter referred to as a front wheel drive unit) including an internal combustion engine 4 and an electric motor 5 connected in series at the front section of the vehicle, and the drive power of this front wheel drive unit 6 is transmitted to front wheels Wf via a transmission 7; on the other hand, the drive power of a drive unit 1 (hereafter referred to as a rear wheel drive unit) provided at the rear section of the vehicle and separated from the front wheel drive unit 6 is transmitted to rear wheels Wr (RWr and LWr). The electric motor 5 of the front wheel drive unit 6 and the first and second electric motors 2A and 2B of the rear wheel drive unit 1 on the sides of the rear wheels Wr are connected to a battery 9, and electric power supply from the battery 9 and energy regeneration to the battery 9 can be performed. Numeral 8 designates a controller for variously controlling the entire vehicle.

Figure 2:
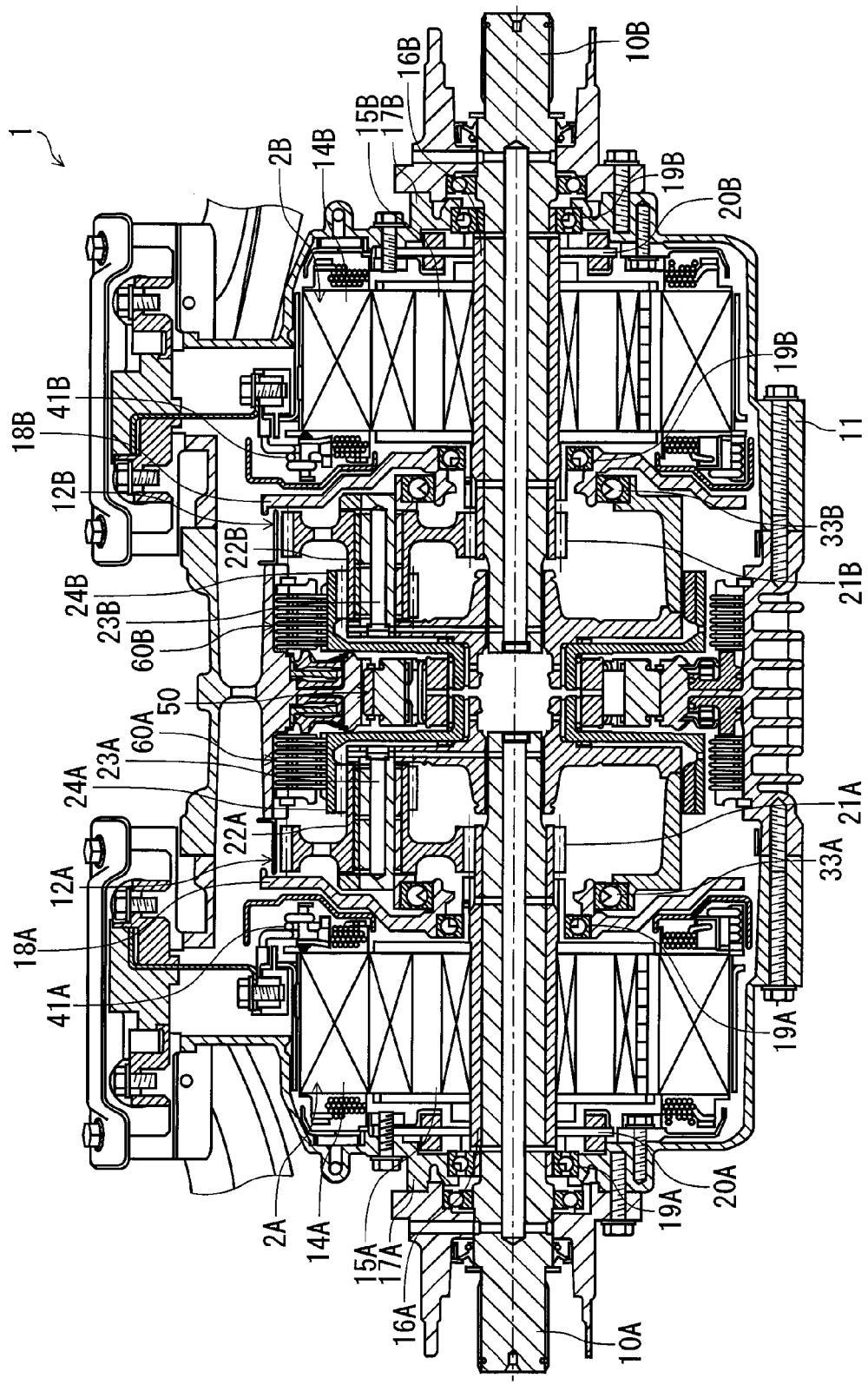
FIG. 2 is a vertical sectional view showing an embodiment of a rear wheel drive unit.
Figure 3:
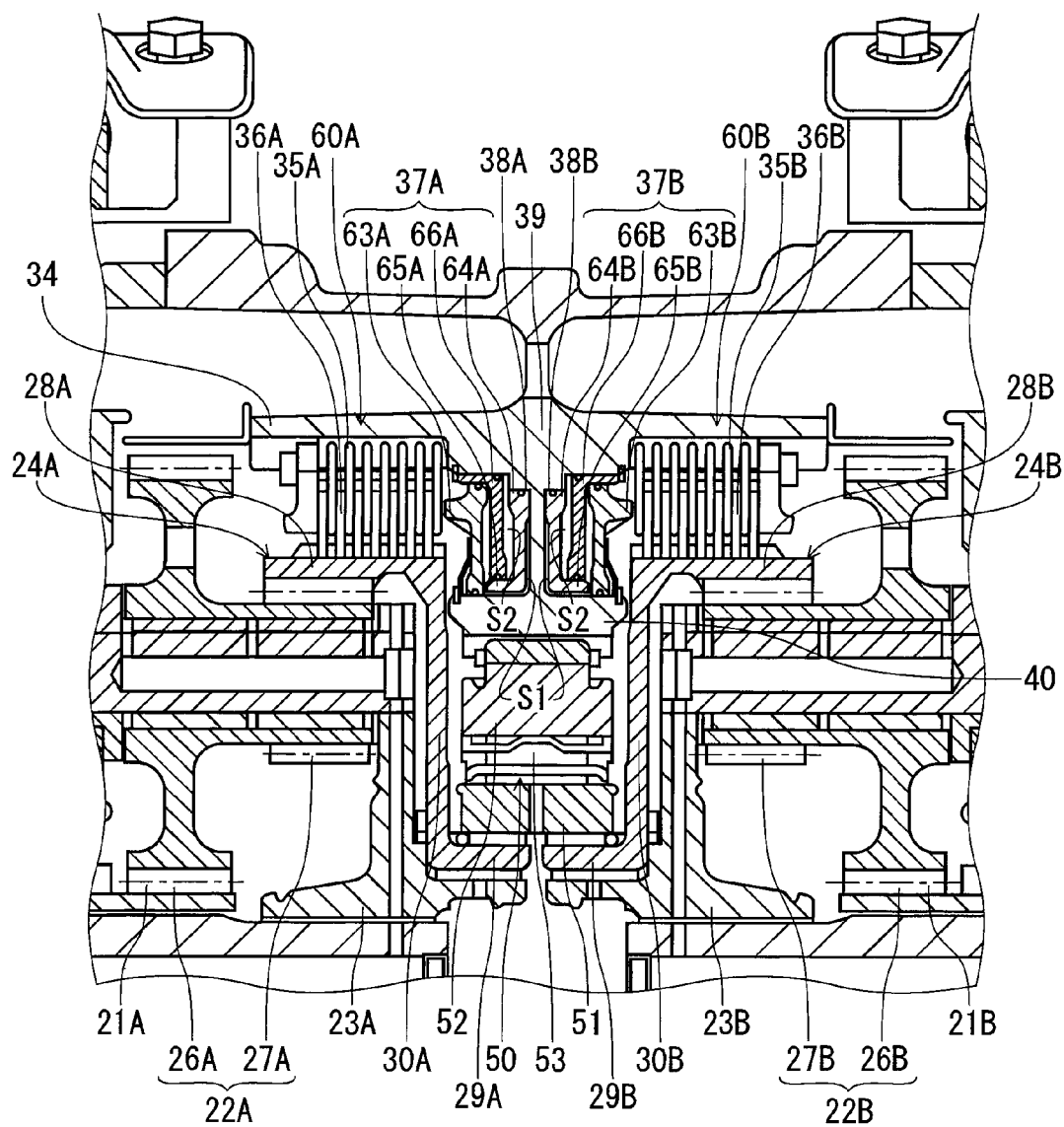
FIG. 3 is a fragmentary enlarged view showing the rear wheel drive unit shown in FIG. 2.

FIG. 2 is a vertical sectional view showing the whole structure of the rear wheel drive unit 1. In the figure, 10A and 10B designate left and right axles on the sides of the rear wheels Wr of the vehicle 3, and these axles are disposed coaxially in the width direction of the vehicle. The reducer case 11 of the rear wheel drive unit 1 is wholly formed into an approximately cylindrical shape, and in the interior thereof, the first and second electric motors 2A and 2B for driving the axles and first and second planetary gear reducers 12A and 12B for reducing the drive rotation speeds of the first and second electric motors 2A and 2B are disposed coaxially with the axles 10A and 10B. The first electric motor 2A and the first planetary gear reducer 12A function as a left wheel drive unit for driving the left rear wheel LWr, and the second electric motor 2B and the second planetary gear reducer 12B function as a right wheel drive unit for driving the right rear wheel RWr. The first electric motor 2A and the first planetary gear reducer 12A and the second electric motor 2B and the second planetary gear reducer 12B are disposed so as to be left-right symmetric in the width direction of the vehicle inside the reducer case 11.

The stators 14A and 14B of the first and second electric motors 2A and 2B are secured to the left and right end side interiors of the reducer case 11, respectively, and ring-shaped rotors 15A and 15B are rotatably disposed on the inner circumferential sides of the stators 14A and 14B. Cylindrical shafts 16A and 16B enclosing the outer circumferences of the axles 10A and 10B are connected to the inner circumferential sections of the rotors 15A and 15B, and these cylindrical shafts 16A and 16B are supported by the end walls 17A and 17B and the intermediate walls 18A and 18B of the reducer case 11 via bearings 19A and 19B so as to be coaxial with the axles 10A and 10B and relatively rotatable therewith. Furthermore, resolvers 20A and 20B for feeding back the rotation position information of the rotors 15A and 15B to the controller (not shown) of the first and second electric motors 2A and 2B are provided on the outer circumferences on one end sides of the cylindrical shafts 16A and 16B and on the end walls 17A and 17B of the reducer case 11.

Moreover, the first and second planetary gear reducers 12A and 12B include sun gears 21A and 21B, pluralities of planetary gears 22A and 22B engaged with the sun gears 21A and 21B, planetary carriers 23A and 23B for supporting these planetary gears 22A and 22B, and ring gears 24A and 24B engaged with the outer circumferential sides of the planetary gears 22A and 22B, wherein the drive power of the first and second electric motors 2A and 2B is input from the sun gears 21A and 21B and the drive power obtained after speed reduction is output via the planetary carriers 23A and 23B.

The sun gears 21A and 21B are integrated with the cylindrical shafts 16A and 16B. In addition, as shown in FIG. 3, for example, the planetary gears 22A and 22B are duplex pinions having large-diameter first pinions 26A and 26B directly engaged with the sun gears 21A and 21B and small-diameter second pinions 27A and 27B being smaller in diameter than the first pinions 26A and 26B, and the first pinions 26A and 26B and the second pinions 27A and 27B are integrated so as to be coaxial and offset in the axial direction. The planetary gears 22A and 22B are supported by the planetary carriers 23A and 23B, and the axially inner end sections of the planetary carriers 23A and 23B are extended inward in the radial direction, spline-fitted in the axles 10A and 10B and supported so as to be integrally rotatable and also supported by the intermediate walls 18A and 18B via bearings 33A and 33B.

The intermediate walls 18A and 18B are configured so as to separate electric motor accommodating spaces for accommodating the first and second electric motors 2A and 2B from reducer spaces for accommodating the first and second planetary gear reducers 12A and 12B and so as to be curved so that the mutual axial distances therebetween are increased from the outer diameter sides to the inner diameter sides thereof. Furthermore, the bearings 33A and 33B for supporting the planetary carriers 23A and 23B are disposed on the inner diameter sides of the intermediate walls 18A and 18B and on the sides of the first and second planetary gear reducers 12A and 12B. Moreover, bus rings 41A and 41B for the stators 14A and 14B are disposed on the outer diameter sides of the intermediate walls 18A and 18B and on the sides of the first and second electric motors 2A and 2B (see FIG. 2).

The ring gears 24A and 24B include gear sections 28A and 28B, the inner circumferential faces of which are engaged with the small-diameter second pinions 27A and 27B; small-diameter sections 29A and 29B being smaller in diameter than the gear sections 28A and 28B and disposed so as to be opposed to each other at the intermediate position of the reducer case 11; and connection sections 30A and 30B for connecting the axially inner end sections of the gear sections 28A and 28B to the axially outer end sections of the small-diameter sections 29A and 29B in the radial direction. In this embodiment, the maximum radius of the ring gears 24A and 24B is set so as to be smaller than the maximum distance of the first pinions 26A and 26B from the center of the axles 10A and 10B. The small-diameter sections 29A and 29B are respectively spline-fitted in the inner race 51 of a one-way clutch 50 described later, and the ring gears 24A and 24B are configured so as to be rotated integrally with the inner race 51 of the one-way clutch 50.

Cylindrical space sections are securely obtained between the reducer case 11 and the ring gears 24A and 24B, and hydraulic brakes 60A and 60B for locking the ring gears 24A and 24B are disposed inside the space sections so as to overlap the first pinions 26A and 26B in the radial direction and to overlap the second pinions 27A and 27B in the axial direction. In the hydraulic brakes 60A and 60B, pluralities of stationary plates 35A and 35B spline-fitted in the inner circumferential face of a cylindrical outer diameter side support section 34 extending in the axial direction on the inner diameter side of the reducer case 11 and plural rotation plates 36A and 36B spline-fitted in the outer circumferential faces of the ring gears 24A and 24B are disposed alternately in the axial direction, and these plates 35A, 35B, 36A and 36B are engaged and released to each other by ring-shaped pistons 37A and 37B. The pistons 37A and 37B are accommodated so as to be advanced and retracted in ring-shaped cylinder chambers 38A and 38B formed between a left-right partition wall 39 extended from the intermediate position of the reducer case 11 to the inner diameter side thereof and the outer diameter side support section 34 and an inner diameter side support section 40 connected by the left-right partition wall 39, wherein the pistons 37A and 37B are advanced by introducing high-pressure oil into the cylinder chambers 38A and 38B and retracted by discharging the oil from the cylinder chambers 38A and 38B. The hydraulic brakes 60A and 60B are connected to an electric oil pump 70 (see FIG. 1).

Furthermore, in more detail, the pistons 37A and 37B have first piston walls 63A and 63B and second piston walls 64A and 64B in the axial front-rear direction, and these piston walls 63A, 63B, 64A and 64B are connected by cylindrical inner circumferential walls 65A and 65B. Hence, ring-shaped spaces being open outward in the radial direction are formed between the first piston walls 63A and 63B and the second piston walls 64A and 64B, and the ring-shaped spaces are partitioned in the axial left-right direction by partition members 66A and 66B secured to the inner circumferential faces of the outer walls of the cylinder chambers 38A and 38B. The spaces between left-right partition wall 39 of the reducer case 11 and the second piston walls 64A and 64B are used as first actuation chambers S1 into which high-pressure oil is introduced directly, and the spaces between the partition members 66A and 66B and the first piston walls 63A and 63B are used as second actuation chambers S2 communicating with the first actuation chambers S1 via through holes formed in the inner circumferential walls 65A and 65B. The spaces between the second piston walls 64A and 64B and the partition members 66A and 66B communicate with the atmosphere.

In the hydraulic brakes 60A and 60B, oil is introduced into the first actuation chambers S1 and the second actuation chambers S2 from a hydraulic circuit, not shown, and the stationary plates 35A and 35B and the rotation plates 36A and 36B can be pressed against each other by the oil pressure acting on the first piston walls 63A and 63B and the second piston walls 64A and 64B. Hence, large pressure-receiving areas can be obtained by the first and second piston walls 63A, 63B, 64A and 64B in the axial left-right direction, whereby large press forces for the stationary plates 35A and 35B and the rotation plates 36A and 36B can be obtained while the radial areas of the pistons 37A and 37B are suppressed.

In the case of the hydraulic brakes 60A and 60B, the stationary plates 35A and 35B are supported by the outer diameter side support section 34 extended from the reducer case 11, and the rotation plates 36A and 36B are supported by the ring gears 24A and 24B. Hence, when the plates 35A and 36A and the plates 35B and 36B are pressed by the pistons 37A and 37B, braking forces are applied to lock the ring gears 24A and 24B by the frictional engagement between the plates 35A and 36A and between the plates 35B and 36B. When the engagement by the pistons 37A and 37B is released from the state, the ring gears 24A and 24B are allowed to rotate freely.

In other words, at the time of the engagement, the hydraulic brakes 60A and 60B serves as a rotation restrictor, and locks the ring gears 24A and 24B, whereby the power transmission path between the first and second electric motors 2A and 2B and the rear wheels Wr is set to a connection state in which power transmission is possible. At the time of the releasing, the ring gears 24A and 24B are allowed to rotate, and the power transmission path between the first and second electric motors 2A and 2B and the rear wheels Wr is set to a disconnection state in which power transmission is impossible.

Furthermore, a space section is securely obtained between the connection sections 30A and 30B of the ring gears 24A and 24B opposed in the axial direction, and the one-way clutch 50 for transmitting the drive power to the ring gears 24A and 24B in only one direction and for shutting off the transmission of the drive power in the other direction is disposed in the space section. The one-way clutch 50 is formed of a plurality of sprags 53 interposed between the inner race 51 and the outer race 52 thereof, and the inner race 51 is configured so as to be integrally rotated with the small-diameter sections 29A and 29B of the ring gears 24A and 24B by virtue of spline fitting. In other words, the ring gear 24A and the ring gear 24B are connected to each other by the inner race 51 so as to be integrally rotatable. Moreover, the outer race 52 is positioned by the inner diameter side support section 40 and prevented from being rotated.

When the vehicle 3 travels forward by virtue of the drive power of the first and second electric motors 2A and 2B, the one-way clutch 50 is configured so as to engage, thereby locking the rotations of the ring gears 24A and 24B. More specifically, the one-way clutch 50 is held in its engaged state when the torques in the forward direction (the rotation direction when the vehicle 3 is moved forward) on the sides of the first and second electric motors 2A and 2B are input to the rear wheels Wr. The one-way clutch 50 is held in its disengaged state when the torques in the reverse direction on the sides of the first and second electric motors 2A and 2B are input to the rear wheels Wr. Furthermore, the one-way clutch 50 is held in its disengaged state when the torques in the forward direction on the sides of the rear wheels Wr are input to the first and second electric motors 2A and 2B, and the one-way clutch 50 is held in its engaged state when the torques in the reverse direction on the sides of the rear wheels Wr are input to the first and second electric motors 2A and 2B. In other words, at the time of the disengagement, the one-way clutch 50 allows the ring gears 24A and 24B to be rotated in one direction by the reversely-oriented torques of the first and second electric motors 2A and 2B. At the time of the engagement, the one-way clutch 50 restricts the ring gears 24A and 24B from being rotated in the reverse direction by the forwardly-oriented torques of the first and second electric motors 2A and 2B. The reversely-oriented torque is the torque acting in the reverse direction in which the rotation in the reverse direction is increased or the torque acting in the reverse direction in which the rotation in the forward direction is decreased.

As described above, in the rear wheel drive unit 1 according to this embodiment, the one-way clutch 50 and the hydraulic brakes 60A and 60B are provided in parallel on the power transmission paths between the first and second electric motors 2A and 2B and the rear wheels Wr. Both the hydraulic brakes 60A and 60B are not necessarily required to be provided. One hydraulic brake may be provided in one space and the other space may be used as a breather chamber.

The controller 8 (see FIG. 1) is a controller for variously controlling the entire vehicle. The speed sensor values of the wheels, the motor rotation speed sensor values of the first and second electric motors 2A and 2B, the steering angle of the steering wheel, the opening AP of the accelerator pedal, the position of the shift, the charged state (SOC) of the battery 9, oil temperature, etc. are input to the controller 8. On the other hand, signals for controlling the internal combustion engine 4, signals for controlling the first and second electric motors 2A and 2B, signals for controlling the electric oil pump 70, etc. are output from the controller 8.

In other words, the controller 8 is at least equipped with a function of serving as an electric motor-generator controller for controlling the first and second electric motors 2A and 2B and a function of serving as a rotation restrictor controller for controlling the hydraulic brakes 60A and 60B serving as rotation restrictor.

FIGS. 4 to 12 are speed alignment charts in various states of the rear wheel drive unit 1. "LMOT" designates the first electric motor 2A and "RMOT" designates the second electric motor 2B. "S" and "C" on the left side designate the sun gear 21A of the first planetary gear reducer 12A connected to the first electric motor 2A and the planetary carrier 23A of the first planetary gear reducer 12A, respectively, and "S" and "C" on the right side designate the sun gear 21B of the second planetary gear reducer 12B and the planetary carrier 23B of the second planetary gear reducer 12B. "R" designates the ring gears 24A and 24B of the first and second planetary gear reducers 12A and 12B, "BRK" designates the hydraulic brakes 60A and 60B, and "OWC" designates the one-way clutch 50. In the following descriptions, the rotation direction of the sun gears 21A and 21B at the time of forward travel of the vehicle using the first and second electric motors 2A and 2B is assumed to be the forward direction. In addition, in each figure, the upper portion thereof represents the rotation in the forward direction from the stop state of the vehicle and the lower portion thereof represents the rotation in the reverse direction. Furthermore, an upward arrow indicates a torque in the forward direction and a downward arrow indicates a torque in the reverse direction.

Figure 4:
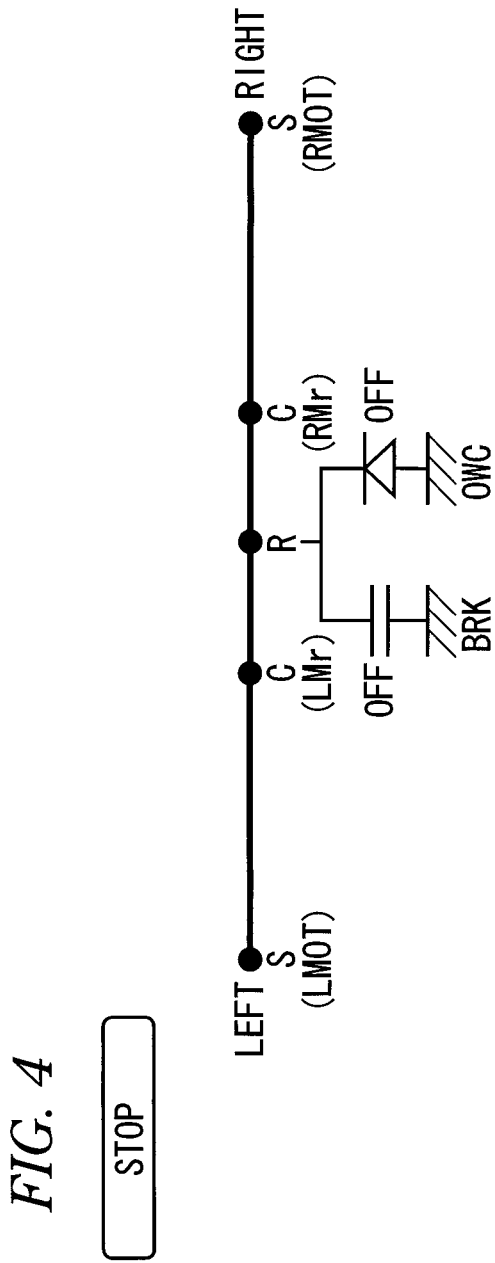
FIG. 4 is a speed alignment chart for the rear wheel drive unit at the stop time of the vehicle.

At the stop time of the vehicle, the front wheel drive unit 6 and the rear wheel drive unit 1 do not perform driving. Hence, as shown in FIG. 4, the first and second electric motors 2A and 2B of the rear wheel drive unit 1 are stopped, and the axles 10A and 10B are also stopped, whereby no torque is applied to these components. At this time, the hydraulic brakes 60A and 60B are released (OFF). Furthermore, the one-way clutch 50 is not engaged (OFF) because the first and second electric motors 2A and 2B are not driven.

Figure 5:
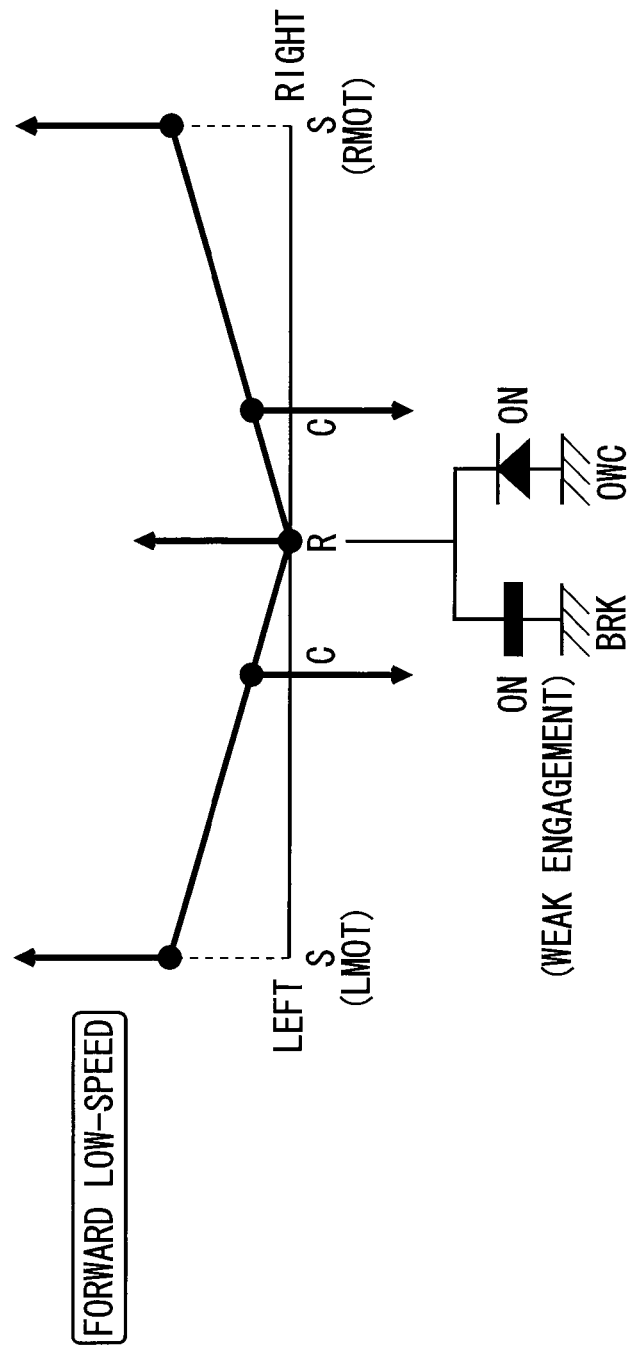
FIG. 5 is a speed alignment chart for the rear wheel drive unit at the time of forward low-speed travel of the vehicle.

Then, after the key position of the vehicle is set to ON, the rear wheels are driven by the rear wheel drive unit 1 at the time of forward low-speed travel, such as EV start or EV cruise, in which motor efficiency is high. As shown in FIG. 5, when power drive is performed so that the first and second electric motors 2A and 2B rotate in the forward direction, forward direction torques are applied to the sun gears 21A and 21B. At this time, as detailed above, the one-way clutch 50 is engaged and the ring gears 24A and 24B are locked. Hence, the planetary carriers 23A and 23B rotate in the forward direction and the vehicle travels forward. Travel resistance from the axles 10A and 10B is applied to the planetary carriers 23A and 23B in the reverse direction. In this way, at the start time of the vehicle 3, the key position is set to ON and the torques of the electric motors 2A and 2B are raised, whereby the one-way clutch 50 is engaged mechanically and the ring gears 24A and 24B are locked.

At this time, the hydraulic brakes 60A and 60B are controlled to a weakly engaged state. The weakly engaged state is a state in which engagement is performed with weak engagement forces smaller than the engagement forces obtained in the engaged state of the hydraulic brakes 60A and 60B and power transmission is possible. When the forward torques of the first and second electric motors 2A and 2B are input to the rear wheels Wr, the one-way clutch 50 is engaged, and power transmission can be performed using only the one-way clutch 50. However, in the case that the hydraulic brakes 60A and 60B provided in parallel with the one-way clutch 50 are set to the weakly engaged state so that the first and second electric motors 2A and 2B are set to the state of being connected to the rear wheels Wr, even if the input levels of the forward torques from the first and second electric motors 2A and 2B become lower temporarily and the one-way clutch 50 is disengaged, it is possible to suppress the transmission of the drive power between the first and second electric motors 2A and 2B and the rear wheels Wr from becoming disabled. Furthermore, when the travel mode of the vehicle is switched to deceleration regeneration described later, it is not necessary to perform rotation speed control for setting the first and second electric motors 2A and 2B to the state of being connected to the rear wheels Wr. Since the engagement forces of the hydraulic brakes 60A and 60B at the time when the one-way clutch 50 is engaged are made weaker than the engagement forces of the hydraulic brakes 60A and 60B at the time when the one-way clutch 50 is disengaged, energy to be consumed for engaging the hydraulic brakes 60A and 60B is reduced. Since the one-way clutch 50 is engaged or the hydraulic brakes 60A and 60B are engaged, the ring gears 24A and 24B are restricted from being rotated freely (this state is hereafter referred to as a ring-locking state), and in the following descriptions, the drive control for the first and second electric motors 2A and 2B in a state in which the first and second electric motors 2A and 2B are connected to the rear wheels Wr and the drive power can be transmitted thereto is also referred to as ring-locking control.

Figure 6:
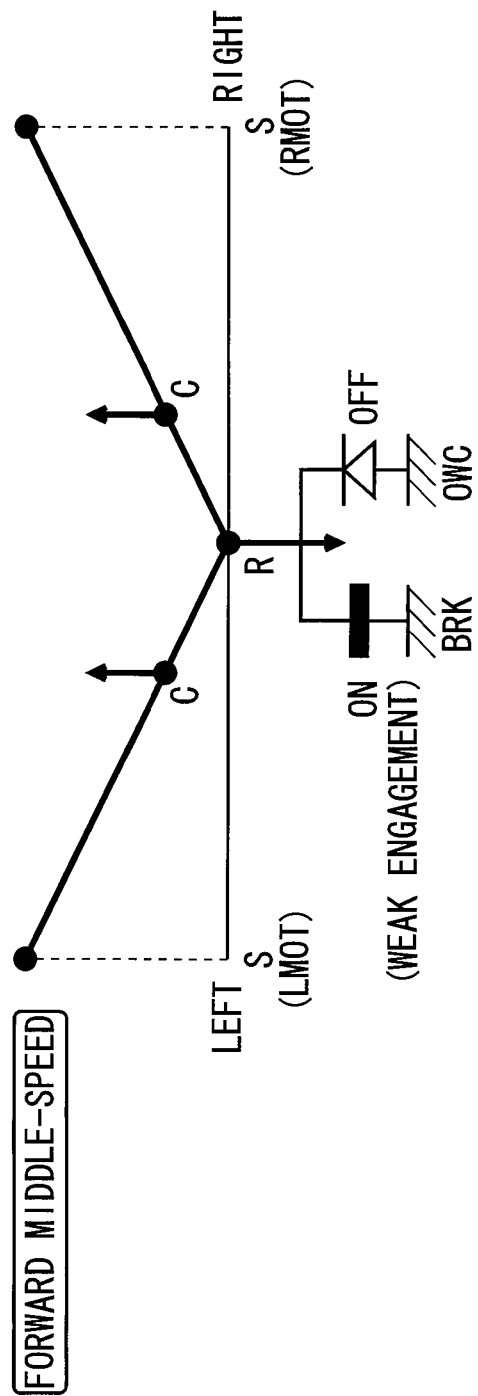
FIG. 6 is a speed alignment chart for the rear wheel drive unit at the time of forward middle-speed travel of the vehicle.

When the vehicle speed increases from the speed of the forward low-speed travel to the speed of the forward middle-speed travel in which engine efficiency is high, rear-wheel drive using the rear wheel drive unit 1 is shifted to front-wheel drive using the front wheel drive unit 6. As shown in FIG. 6, when the power drive of the first and second electric motors 2A and 2B is stopped, forward torques for performing forward travel are exerted from the axles 10A and 10B to the planetary carriers 23A and 23B, whereby the one-way clutch 50 is disengaged as described above. At this time, the hydraulic brakes 60A and 60B are also controlled so as to be set to the weakly engaged state.

Figure 7:
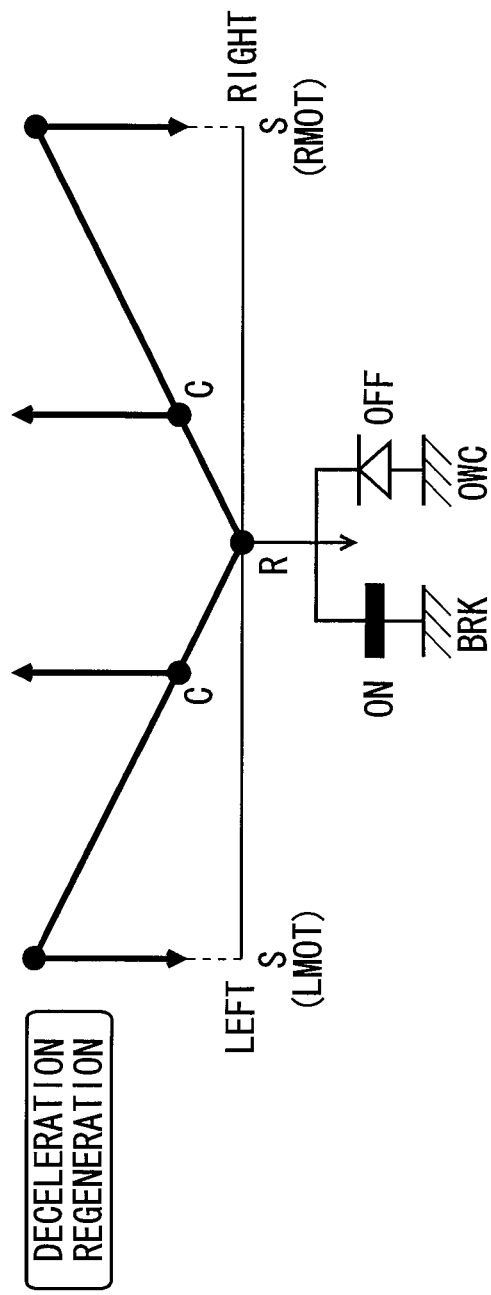
FIG. 7 is a speed alignment chart for the rear wheel drive unit at the time of deceleration regeneration.

When the first and second electric motors 2A and 2B being in the state shown in FIG. 5 or 6 are driven by regeneration, the forward torques for continuing forward travel are exerted from the axles 10A and 10B to the planetary carriers 23A and 23B as shown in FIG. 7, whereby the one-way clutch 50 is disengaged as described above. At this time, the hydraulic brakes 60A and 60B are controlled so as to be set to the engaged state (ON). Hence, the ring gears 24A and 24B are locked, regenerative braking torques in the reverse direction are exerted to the first and second electric motors 2A and 2B, and deceleration regeneration is performed in the first and second electric motors 2A and 2B. When the forward torques on the side of the rear wheels Wr are input to the first and second electric motors 2A and 2B as described above, the one-way clutch 50 is disengaged, and power cannot be transmitted using only the one-way clutch 50. However, in the case that the hydraulic brakes 60A and 60B provided in parallel with the one-way clutch 50 are engaged and the first and second electric motors 2A and 2B are set to the state of being connected to the rear wheels Wr, the state in which power transmission is possible can be maintained. In this state, the first and second electric motors 2A and 2B are controlled so as to be set to a regeneration drive state, whereby the energy of the vehicle 3 can be regenerated.

At the time of forward high-speed travel, front-wheel drive using the front wheel drive unit 6 is performed. At this time, control is performed to stop the first and second electric motors 2A and 2B and to release the hydraulic brakes 60A and 60B. Since the forward torques on the side of the rear wheels Wr are input to the first and second electric motors 2A and 2B, the one-way clutch 50 is disengaged, and the hydraulic brakes 60A and 60B are controlled so as to be set to the released state, whereby the ring gears 24A and 24B starts rotating.

Figure 8:
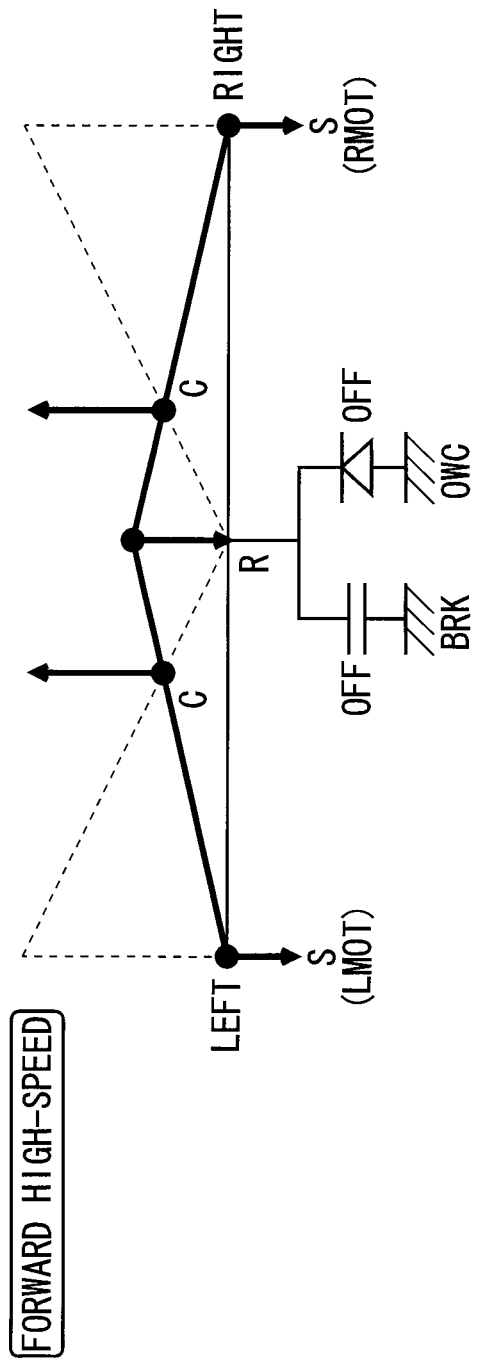
FIG. 8 is a speed alignment chart for the rear wheel drive unit at the time of forward high-speed travel time of the vehicle.

As shown in FIG. 8, when the power drive of the first and second electric motors 2A and 2B is stopped, forward torques for performing forward travel are exerted from the axles 10A and 10B to the planetary carriers 23A and 23B, whereby the one-way clutch 50 is disengaged as described above. At this time, the rotation losses of the sun gears 21A and 21B and the first and second electric motors 2A and 2B are input to the sun gears 21A and 21B as a resistance, and the rotation losses of the ring gears 24A and 24B are generated in the ring gears 24A and 24B.

The ring gears 24A and 24B are allowed to rotate freely (hereafter referred to as a ring-free state) by performing control to set the hydraulic brakes 60A and 60B to the released state, whereby the first and second electric motors 2A and 2B are disconnected from the rear wheels Wr and power transmission cannot be performed. Hence, accompanied rotations of the first and second electric motors 2A and 2B are prevented. In addition, over speed of the first and second electric motors 2A and 2B is prevented at the time of high-speed travel using the front wheel drive unit 6. In the above description, the first and second electric motors 2A and 2B are stopped in the ring-free state. However, the first and second electric motors 2A and 2B may be driven in the ring-free state (hereafter simply referred to as ring-free control). The ring-free control will be described later.

Figure 9:
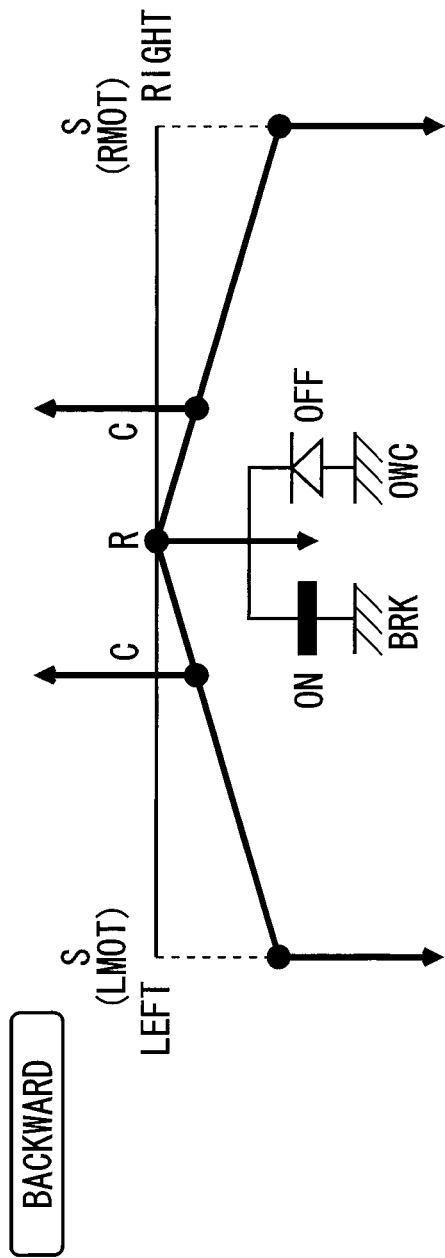
FIG. 9 is a speed alignment chart for the rear wheel drive unit at the time of backward travel of the vehicle.

At the time of backward travel, as shown in FIG. 9, when the first and second electric motors 2A and 2B are subjected to reverse power drive, reverse torques are applied to the sun gears 21A and 21B. At this time, the one-way clutch 50 is disengaged as described above.

At this time, control is performed to set the hydraulic brakes 60A and 60B to the engaged state (ON). Hence, the ring gears 24A and 24B are locked, and the planetary carriers 23A and 23B are rotated in the reverse direction, and backward travel is performed. The travel resistance from the axles 10A and 10B is exerted to the planetary carriers 23A and 23B in the forward direction. When the reverse torques from the first and second electric motors 2A and 2B are input to the rear wheels Wr as described above, the one-way clutch 50 is disengaged, and the drive power cannot be transmitted using only the one-way clutch 50. However, in the case that the hydraulic brakes 60A and 60B provided in parallel with the one-way clutch 50 are engaged and the first and second electric motors 2A and 2B are set to the state of being connected to the rear wheels Wr, the state in which power transmission is possible can be maintained, and the vehicle 3 can be moved backward using the torques of the first and second electric motors 2A and 2B.

In the descriptions of FIGS. 5 to 9, the states of the vehicle traveling straight have been described in which no difference is present between the rotation speeds of the left rear wheel LWr and the right rear wheel RWr, that is, no difference is present between the rotation speeds of the planetary carrier 23A and the planetary carrier 23B. However, FIGS. 10 to 12 show the states of the vehicle during turning in which a difference is present between the rotation speeds of the left rear wheel LWr and the right rear wheel RWr, that is, a difference is present between the rotation speeds of the planetary carrier 23A and the planetary carrier 23B. Furthermore, FIGS. 10 to 12 show the states of the vehicle during turning at the time of forward middle-speed travel described above, that is, at the time of the front wheel drive state of the vehicle using the front wheel drive unit 6.

Figure 10A:
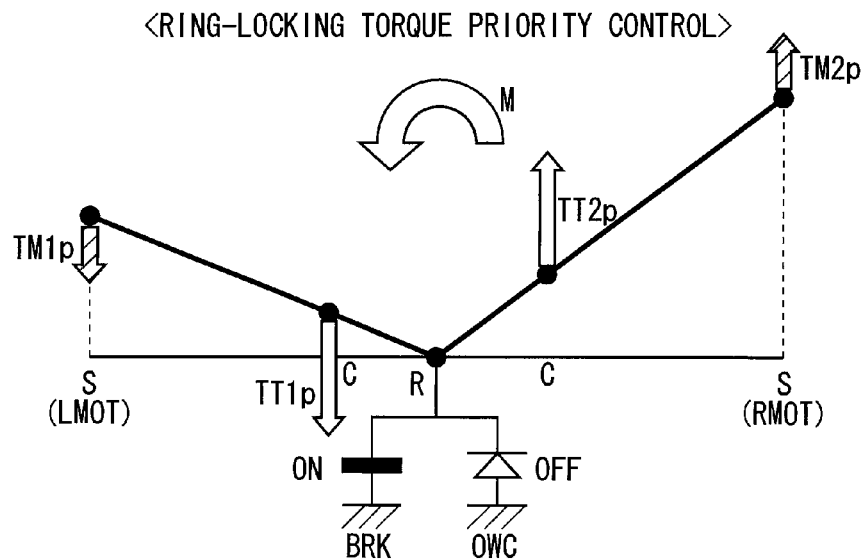
FIG. 10A is a speed alignment chart for the rear wheel drive unit during ring-locking torque priority control.

FIG. 10A shows the state of the vehicle at the time of left turning in which the rotation speed of the right rear wheel RWr (the planetary carrier 23B) is higher than that of the left rear wheel LWr (the planetary carrier 23A). In the following descriptions, left turning control is taken as an example of turning control. However, similar control can also be performed at the time of right turning. Moreover, FIGS. 10 to 12 show left and right rear wheel torques that are exerted to the left and right rear wheels LWr and RWr (the planetary carriers 23A and 23B) by virtue of the torques of the first and second electric motors 2A and 2B and that have not been described above in FIGS. 5 to 9.

Besides, in contrast to the ring-free control for releasing the ring gears 24A and 24B by disengaging the one-way clutch 50 and by releasing the hydraulic brakes 60A and 60B described above, the control for driving the first and second electric motors 2A and 2B in a state in which the ring gears 24A and 24B are restricted from rotating freely (this state is hereafter referred to as a ring-locking state) because the one-way clutch 50 is engaged and/or the hydraulic brakes 60A and 60B are engaged or weakly engaged and the first and second electric motors 2A and 2B are connected to the rear wheels Wr so that the drive power can be transmitted is referred to as ring-locking control in the following descriptions.

<<Ring-Locking Control>>

The ring-locking control is control for driving the first and second electric motors 2A and 2B in the ring-locking state. With this control, target torques can be generated in the first and second electric motors 2A and 2B (ring-locking torque priority control) to satisfy the torque request in the front-rear direction (hereafter also referred to as a target acceleration/deceleration torque) and the torque request in the turning direction (hereafter also referred to as a target yaw moment), and the first and second electric motors 2A and 2B can be controlled (ring-locking electric power priority control) based on the sum (hereafter also referred to as a target left-right electric power sum) of the electric power generated or consumed by the first electric motor 2A and the electric power generated or consumed by the first electric motor 2B.

<Ring-Locking Torque Priority Control>

First, ring-locking torque priority control will be described below.

In the ring-locking state in which the first and second electric motors 2A and 2B are connected to the rear wheels Wr so that the drive power can be transmitted, the ring-locking torque priority control is performed to satisfy the target acceleration/deceleration torque and the target yaw moment by controlling the first and second electric motors 2A and 2B based on the relationship of the total target torque of the left and right rear wheels LWr and RWr and the relationship of the difference between the target torques of the left and right rear wheels LWr and RWr. It is possible to say that the ring-locking torque priority control is a combination of left-right sum control for controlling the motor torque sum of the motor torque of the first electric motor 2A and the motor torque of the second electric motor 2B to satisfy the target acceleration/deceleration torque and left-right difference control for controlling the motor torque difference between the motor torque of the first electric motor 2A and the motor torque of the second electric motor 2B to satisfy the target yaw moment in the ring-locking state.

The ring-locking torque priority control will be described below specifically by taking the control to be performed at the time of left turning as an example. As shown in FIG. 10A, torque control is performed so that a first motor torque TM1$p$ in the reverse direction is generated in the first electric motor 2A, whereby the first motor torque TM1$p$ in the reverse direction is exerted to the sun gear 21A. Since the free rotation of the ring gears 24A and 24B is restricted at this time, in the first planetary gear reducer 12A, the ring gears 24A and 24B serve as a fulcrum, and the first motor torque TM1$p$ in the reverse direction is exerted to the sun gear 21A serving as a power point. As a result, a left rear wheel torque TT1$p$ in the reverse direction obtained by multiplying the reduction ratio of the first planetary gear reducer 12A to the first motor torque TM1$p$ is exerted as a first motor torque distribution force to the planetary carrier 23A serving as an application point.

On the other hand, torque control is performed so that a second motor torque TM2$p$ in the forward direction is generated in the second electric motor 2B, whereby the second motor torque TM2$p$ in the forward direction is exerted to the sun gear 21B. Since the free rotation of the ring gears 24A and 24B is restricted at this time, in the second planetary gear reducer 12B, the ring gears 24A and 24B serve as a fulcrum, and the second motor torque TM2$p$ in the forward direction is exerted to the sun gear 21B serving as a power point. As a result, a right rear wheel torque TT2$p$ in the forward direction obtained by multiplying the reduction ratio of the second planetary gear reducer 12B to the second motor torque TM2$p$ is exerted as a second motor torque distribution force to the planetary carrier 23B serving as an application point.

A method for calculating the first and second motor torques TM1$p$ and TM2$p$ in the ring-locking torque priority control will be described using mathematical expressions, When it is assumed that the target torque of the left rear wheel LWr is WTT1, that the target torque of the right rear wheel RWr is WTT2, that the total target torque of the left and right rear wheels LWr and RWr (the sum of the left rear wheel torque and the right rear wheel torque) is TRT, and that the difference between the target torques of the left and right rear wheels LWr and RWr (the difference between the left rear wheel torque and the right rear wheel torque) is ATT, the following expression (1) is established from the relationship of the total target torque of the left and right rear wheels LWr and RWr, and the following expression (2) is established from the relationship of the difference between the target torques of the left and right rear wheels LWr and RWr.

$$WTT1 + WTT2 = TRT \quad (1)$$

$$WTT1 - WTT2 = \Delta TT \quad (2)$$

When it is assumed that the target yaw moment (clockwise direction is positive) is YMT, that the radius of the wheel is r, and that the tread width (the distance between the left and right rear wheels LWr and RWr) is Tr, $\Delta TT$ is represented by the following expression (3).

$$\Delta TT = 2 \cdot r \cdot YMT / Tr \quad (3)$$

Hence, the target torques WTT1 and WTT2 of the left and right rear wheels LWr and RWr are determined uniquely by the above-mentioned expressions (1) and (2).

Furthermore, when it is assumed that the target torque of the first electric motor 2A connected to the left rear wheel LWr is TTM1 and that the target torque of the second electric motor 2B connected to the right rear wheel RWr is TTM2, the target torques TTM1 and TTM2 of the first and second electric motors 2A and 2B on the left and right sides are derived from the following expressions (4) and (5).

$$TTM1 = (1/\text{Ratio}) \cdot WTT1 \quad (4)$$

$$TTM2 = (1/\text{Ratio}) \cdot WTT2 \quad (5)$$

Ratio designates the reduction ratio (gear ratio) of the first and second planetary gear reducers 12A and 12B.

The first and second motor torques TM1$p$ and TM2$p$ are obtained from the target torques TTM1 and TTM2 of the first and second electric motors 2A and 2B obtained as described above.

It is herein assumed in FIG. 10A that the target acceleration/deceleration torque is zero and that the target yaw moment YMT is a counterclockwise yaw moment. In this case, since it is assumed that the target acceleration/deceleration torque is zero, WTT1=−WTT2 is established according to the above-mentioned expression (1), and the first and second motor torques TM1$p$ and TM2$p$ are torques being equal in absolute value but opposite in direction according to the above-mentioned expressions (4) and (5).

Furthermore, since the direction of the target yaw moment YMT is counterclockwise, the first motor torque TM1$p$ is a regenerative torque and the second motor torque TM2$p$ is a power drive torque.

As a result, a counterclockwise yaw moment M depending on the torque difference (TT1$p$−TT2$p$) between the left and right rear wheel torques TT1$p$ and TT2$p$ is stably generated in the vehicle 3. On the other hand, since the torque sum (TT1$p$+TT2$p$) of the left and right rear wheel torques TT1$p$ and TT2$p$ is zero, no acceleration/deceleration torque is generated in the vehicle 3.

Figure 10B:
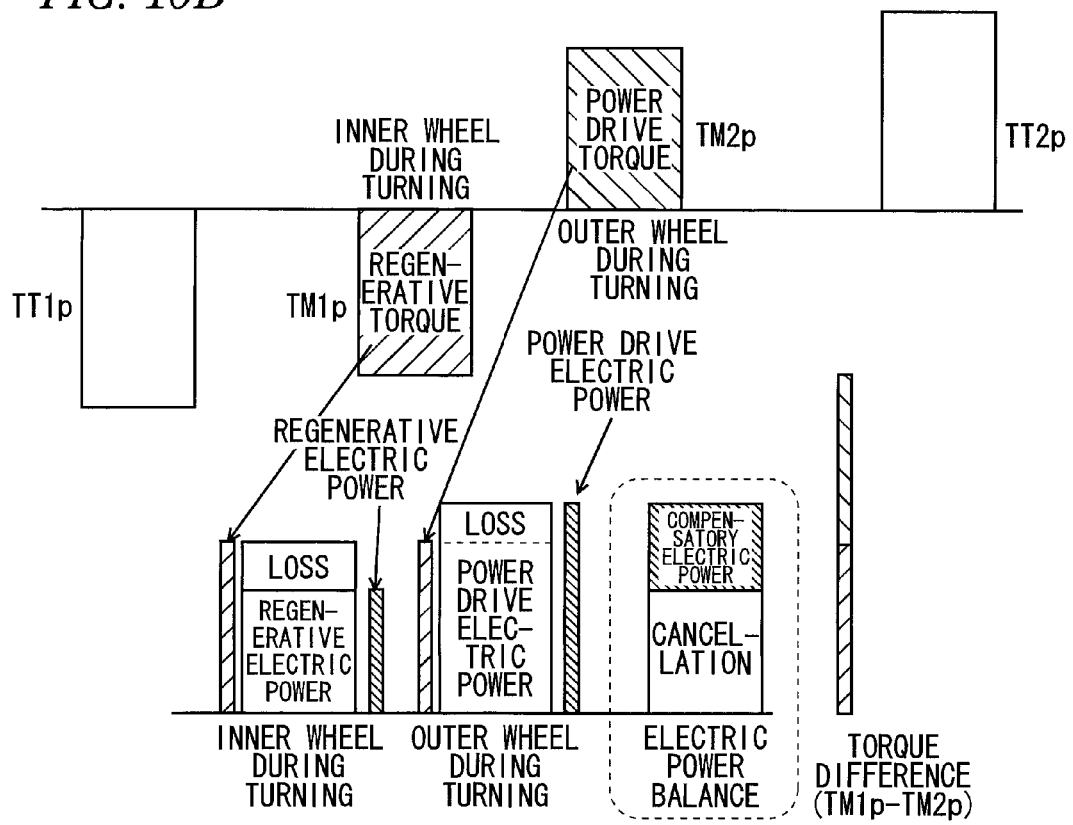
FIG. 10B is a view showing a torque balance and an electric power balance during the control.

Moreover, the electric power balance of the ring-locking torque priority control in FIG. 10A will be described below referring to FIG. 10B. By the regenerative drive of the first electric motor 2A, regenerative electric power obtained by subtracting the electric power amounting to regenerative loss from the electric power corresponding to the regenerative torque (the first motor torque TM1$p$) is generated in the first electric motor 2A. In order that the power drive torque (the second motor torque TM2$p$) being equal in absolute value to the regenerative torque (the first motor torque TM1$p$) of the left rear wheel LWr is generated at the right rear wheel RWr, power drive electric power obtained by adding the electric power amounting to the power drive loss to the electric power corresponding to the power drive torque (the second motor torque TM2$p$) is required in the second electric motor 2B. The electric power balance at this time is described below. The regenerative electric power of the first electric motor 2A is used for the power drive electric power in the second electric motor 2B and thus cancelled, and the remaining electric power (compensatory electric power) obtained by subtracting the regenerative electric power of the first electric motor 2A from the power drive electric power of the second electric motor 2B is supplied from the battery 9 or the electric motor 5 of the front wheel drive unit 6.

Hence, in the ring-locking torque priority control in FIG. 10A, the vehicle 3 is controlled while receiving electric power from an electric power source other than the first and second electric motors 2A and 2B so that the torque requests in the front-rear direction and in the turning direction are satisfied.

In FIG. 10A, a case has been described in which the torque sum (TT1$p$+TT2$p$) of the left and right rear wheel torques TT1$p$ and TT2$p$ is zero. However, when it is assumed that the torque sum (TT1$p$+TT2$p$) of the left and right rear wheel torques TT1$p$ and TT2$p$ is positive, an acceleration torque is exerted to the vehicle 3. In this case, the compensatory electric power is also supplied from the battery 9 or the electric motor 5 of the front wheel drive unit 6 as a matter of course.

<Ring-Locking Electric Power Priority Control>

Next, ring-locking electric power priority control will be described below.

In the ring-locking state in which the first and second electric motors 2A and 2B are connected to the rear wheels Wr so that drive power can be transmitted, the ring-locking electric power priority control is performed to satisfy the target left-right electric power sum and the target yaw moment by controlling the first and second electric motors 2A and 2B based on the relationship of the left-right electric power sum and the relationship of the difference between the target torques of the left and right rear wheels LWr and RWr. It is possible to say that the ring-locking electric power priority control is a combination of electric power control for controlling the left-right electric power sum of the left electric power generated or consumed by the first electric motor 2A and the right electric power generated or consumed by the second electric motor 2B to satisfy the left-right electric power sum and left-right difference control for controlling the motor torque difference between the motor torque of the first electric motor 2A and the motor torque of the second electric motor 2B to satisfy the target yaw moment in the ring-locking state.

The ring-locking electric power priority control is selected, for example, depending on the state of the battery 9 or the electric motor 5 of the front wheel drive unit 6. For example, the control is performed in the case that the temperature of the battery 9 is equal to or less than a predetermined temperature, that is, at the time of the so-called extremely-low temperature, in the case that the remaining capacity of the battery 9 is low, in the case that the electric power generation amount of the electric motor 5 of the front wheel drive unit 6 is insufficient or in the case that the supply and reception of electric power is problematic, for example, at the time when the battery 9 or the electric motor 5 is detected faulty, in the power drive state.

The ring-locking electric power priority control is described below using mathematical expressions. In the ring-locking electric power priority control, in addition to the above-mentioned expression (2), the following expression (6) is derived from the relationship of the left-right electric power sum. P1 is the electric power of the first electric motor 2A, and P2 is the electric power of the second electric motor 2B.

$$P1+P2=0 \quad (6)$$

Since losses occur in the supply and reception of electric power, the regenerative electric power and the power drive electric power can be represented by the following expressions (7) and (8), respectively.

$$\text{Regenerative electric power=mechanical input} \cdot (1- \text{regenerative loss rate}) \quad (7)$$

$$\text{Power drive electric power=mechanical input} \cdot (1+ \text{power drive loss rate}) \quad (8)$$

When it is assumed that the angular velocity of the first electric motor 2A is $\omega 1$, that the angular velocity of the second electric motor 2B is $\omega 2$, that the regenerative loss rate is $Lr1$ and that the power drive loss rate is $Lr2$, and when it is also assumed that the regenerative drive is performed in the first electric motor 2A and that the power drive is performed in the second electric motor 2B, P1 and P2 are represented by the following expressions (9) and (10) based on the above-mentioned expressions (7) and (8), respectively.

$$P1=\omega 1 \cdot TTM1(1-Lr1) \quad (9)$$

$$P2=\omega 2 \cdot TTM2(1+Lr2) \quad (10)$$

wherein $\omega=2\cdot\pi\cdot n/60$ (n is the rotation speed of the electric motor).

When TTM1 and TTM2 are eliminated from the above-mentioned expressions (4) to (6), (9) and (10), the following expression (11) is derived.

$$WTT2=-(\omega 1/\omega 2)\cdot\{(1-Lr1)/(1+Lr2)\}\cdot WTT1 \quad (11)$$

Furthermore, in the ring-locking electric power priority control, the target torques WTT1 and WTT2 of the left and right rear wheels LWr and RWr are obtained based on the above-mentioned expression (2) derived from the relationship of the difference between the target torques of the left and right rear wheels LWr and RWr and the above-mentioned expression (11) derived from the relationship of the left-right electric power sum. Moreover, the target torques TTM1 and TTM2 of the first and second electric motors 2A and 2B are obtained from the target torques WTT1 and WTT2 of the left and right rear wheels LWr and RWr obtained as described above and from the above-mentioned expressions (4) and (5). As a result, first and second motor torques TM1q and TM2q are obtained from the target torques TTM1 and TTM2 of the first and second electric motors 2A and 2B.

When the expression (11) is examined, the angular velocity $\omega 1$ of the first electric motor 2A on the side of the inner wheel is smaller than the angular velocity $\omega 2$ of the second electric motor 2B on the side of the outer wheel ($\omega 1<\omega 2$), and $(1-Lr1)<(1+Lr2)$ is established. Hence, $|TT2|<|TT1|$ and $TT1+TT2<0$ are always established. As a result, in the ring-locking electric power priority control, the total target torque TRT of the left and right rear wheels LWr and RWr always becomes negative, that is, the regenerative torque becomes larger than the power drive torque. Similarly, with respect to the first and second motor torques TM1q and TM2q, $|TM2q|<|TM1q|$ and $TM1q+TM2q<0$ are always established from the above-mentioned expressions (4) and (5).

Figure 11A:
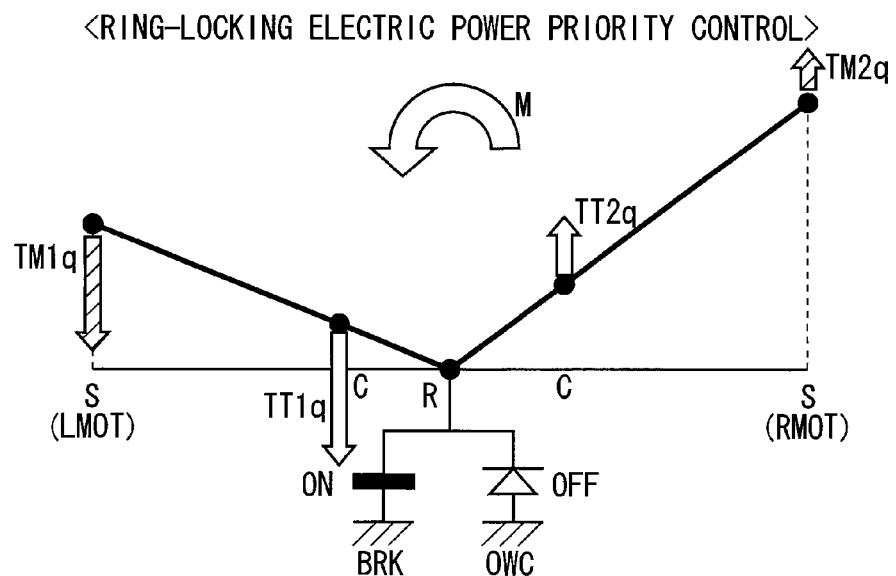
FIG. 11A is a speed alignment chart for the rear wheel drive unit during ring-locking electric power priority control.

It is herein also assumed in FIG. 11A that the direction of the target yaw moment YMT is counterclockwise. In this case, the first motor torque TM1q is a regenerative torque, and the second motor torque TM2q is a power drive torque smaller in absolute value than the first motor torque TM1q serving as the regenerative torque.

Hence, since the absolute value of the first motor torque TM1q in the reverse direction is larger than the absolute value of the second motor torque TM2q in the forward direction, the one-way clutch 50 is disengaged and the hydraulic brakes 60A and 60B are engaged, whereby the first and second electric motors 2A and 2B are connected to the rear wheels Wr and the drive power can be transmitted.

The ring-locking electric power priority control will be described below specifically. As shown in FIG. 11A, torque control is performed so that the first motor torque TM1q in the reverse direction is generated in the first electric motor 2A, whereby the first motor torque TM1q in the reverse direction is exerted to the sun gear 21A. Since the free rotation of the ring gears 24A and 24B is restricted at this time, in the first planetary gear reducer 12A, the ring gears 24A and 24B serve as a fulcrum, and the first motor torque TM1q in the reverse direction is exerted to the sun gear 21A serving as a power point. As a result, a left rear wheel torque TT1q in the reverse direction obtained by multiplying the reduction ratio of the first planetary gear reducer 12A to the first motor torque TM1q is exerted as a first motor torque distribution force to the planetary carrier 23A serving as an application point.

On the other hand, torque control is performed so that the second motor torque TM2q in the forward direction is generated in the second electric motor 2B, whereby the second motor torque TM2q in the forward direction is exerted to the sun gear 21B. Since the free rotation of the ring gears 24A and 24B is restricted at this time, in the second planetary gear reducer 12B, the ring gears 24A and 24B serve as a fulcrum, and the second motor torque TM2q in the forward direction is exerted to the sun gear 21B serving as a power point. As a result, a right rear wheel torque TT2q in the forward direction obtained by multiplying the reduction ratio of the second planetary gear reducer 12B to the second motor torque TM2q is exerted as a second motor torque distribution force to the planetary carrier 23B serving as an application point.

Hence, a counterclockwise yaw moment M is generated stably in the vehicle 3 depending on the torque difference (TT1q-TT2q) between the left and right rear wheel torques TT1q and TT2q.

The difference ΔTT between the target torques of the left and right rear wheels LWr and RWr during the ring-locking electric power priority control is set so as to be equal to the difference ΔTT between the target torques of the left and right rear wheels LWr and RWr during the ring-locking torque priority control shown in FIG. 10A, whereby the motor torque difference (TM1p-TM2p) between the first and second motor torques TM1p and TM2p during the ring-locking torque priority control becomes equal to the motor torque difference (TM1q-TM2q) between the first and second motor torques TM1q and TM2q during the ring-locking electric power priority control, and the same yaw moment M can be generated. On the other hand, since the torque sum (TM1q+TM2q) of the left and right rear wheel torques TT1q and TT2$q$ during the ring-locking electric power priority control is negative, a deceleration (regeneration) torque in the front-rear direction is generated in the vehicle 3.

Figure 11B:
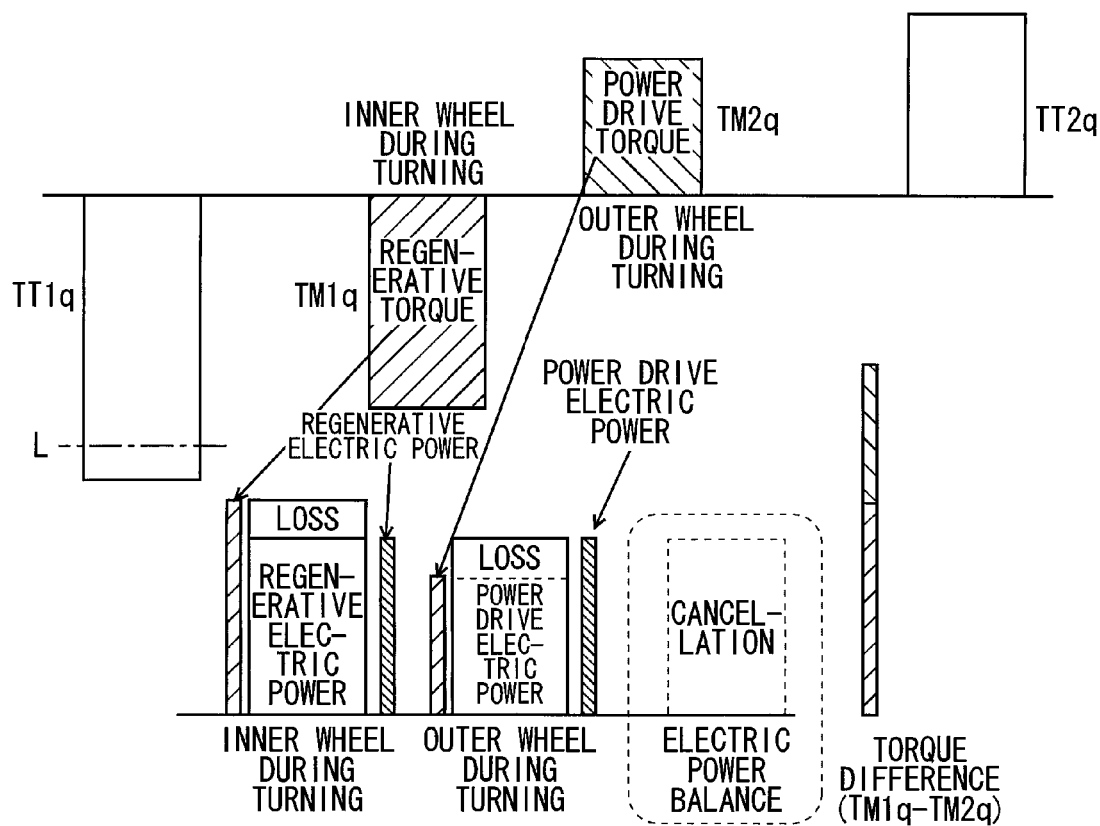
FIG. 11B is a view illustrating a torque balance and an electric power balance during the control.

Furthermore, the electric power balance of the ring-locking electric power priority control in FIG. 11A will be described below referring to FIG. 11B. By the regenerative drive of the first electric motor 2A, regenerative electric power obtained by subtracting the electric power amounting to regenerative loss from the electric power corresponding to the regenerative torque (the first motor torque TM1$q$) is generated in the first electric motor 2A. The second electric motor 2B is power driven using the regenerative electric power generated by the first electric motor 2A, and the power drive torque (the second motor torque TM2$q$) amounting to the electric power obtained by subtracting the electric power amounting to power drive loss from the regenerative electric power generated by the first electric motor 2A is generated in the second electric motor 2B. The electric power balance at this time is such that the regenerative electric power generated in the first electric motor 2A is balanced with the power drive electric power consumed by the second electric motor 2B and such that the supply and reception of electric power is not performed between the battery 9 or the electric motor 5 of the front wheel drive unit 6 and the first and second electric motors 2A and 2B.

Hence, in the ring-locking electric power priority control in FIG. 11A, the priority control is performed to satisfy the torque request in the turning direction without supplying electric power from power sources other than the first and second electric motors 2A and 2B and without supplying electric power thereto. As a result, the rear wheel drive unit 1 can be driven continuously, for example, even in the case that the temperature of the battery 9 is equal to or less than a predetermined temperature, that is, at the time of the so-called extremely-low temperature, in the case that the remaining capacity of the battery 9 is low, in the case that the electric power generation amount of the electric motor 5 of the front wheel drive unit 6 is insufficient or in the case that the supply and reception of electric power is problematic, for example, at the time when the battery 9 or the electric motor 5 is detected faulty, in the power drive state.

However, in the ring-locking electric power priority control, in the case that the yaw moment M being equal in magnitude to that during the ring-locking torque priority control is generated, the regenerative torque (the first motor torque TM1$q$) of the first electric motor 2A on the side of the inner wheel becomes larger than the regenerative torque (the first motor torque TM1$p$) of the first electric motor 2A in the ring-locking torque priority control. Hence, in the case that the target yaw moment YMT is large, the left rear wheel torque TT1$q$ in the reverse direction obtained by multiplying the reduction ratio of the first planetary gear reducer 12A to the regenerative torque (the first motor torque TM1$q$) of the first electric motor 2A is very likely to become more than an inner wheel grip limit threshold value L. If the left rear wheel torque becomes more than the inner wheel grip limit threshold value L, slip occurs at the left rear wheel LWr serving as the inner wheel at the time of turning, and the stability of the vehicle 3 is degraded.

To solve this problem, the controller 8 compares the left rear wheel torque TT1$q$ serving as the inner wheel torque with the inner wheel grip limit threshold value L and releases the hydraulic brakes 60A and 60B when the left rear wheel torque TT1$q$ becomes more than the inner wheel grip limit threshold value L. Hence, the state is switched from the ring-locking state to the ring-free state, and ring-free electric power priority control is performed to maintain the left-right electric power sum, whereby slip at the left rear wheel LWr is prevented from occurring while the target left-right electric power sum is satisfied. The ring-free control, more particularly, the ring-free electric power priority control will be described below.

<<Ring-Free Control>>

The ring-free control is control for driving the first and second electric motors 2A and 2B in the case that the one-way clutch 50 is disengaged and the hydraulic brakes 60A and 60B are released, that is, in the case that the connected ring gears 24A and 24B are allowed to rotate freely (the ring-free state), whereby the first and second electric motors 2A and 2B can be controlled (the ring-free electric power priority control) based on the relationship of the target left-right electric power sum and the relationship of the difference between the target torques of the left and right rear wheels LWr and RWr. It is possible to say that the ring-free electric power priority control is a combination of electric power control for controlling the left-right electric power sum of the left electric power generated or consumed by the first electric motor 2A and the right electric power generated or consumed by the second electric motor 2B to satisfy the left-right electric power sum and left-right difference control for controlling the motor torque difference between the motor torque of the first electric motor 2A and the motor torque of the second electric motor 2B to satisfy the target yaw moment in the ring-free state.

<Ring-Free Electric Power Priority Control>

In the ring-free state, the first and second electric motors 2A and 2B are disconnected from the rear wheels Wr and the drive power cannot be transmitted as described above. However, only left and right torques being equal in absolute value but opposite in direction can be transmitted to the left and right rear wheels LWr and RWr. Hence, in the ring-locking electric power priority control in FIG. 11A, when the state is switched from the ring-locking state to the ring-free state, the right rear wheel torque TT2$q$, the smaller value in absolute value between the left rear wheel torque TT1$q$ and the right rear wheel torque TT2$q$, and only the balanced amount (left rear wheel torque TT1$r$) of the left rear wheel torque TT1$q$, being equal in absolute value to the right rear wheel torque TT2$q$, are transmitted to the left and right rear wheels LWr and RWr.

As a result, in the ring-free electric power priority control, the generated yaw moment corresponds to the torque difference (TT1$r$–TT2$q$) of the left and right rear wheel torques TT1$r$ and TT2$q$, whereby a counterclockwise yaw moment M' is generated which is smaller than the yaw moment M generated in the ring-locking electric power priority control shown in FIG. 11A.

Figure 12A:
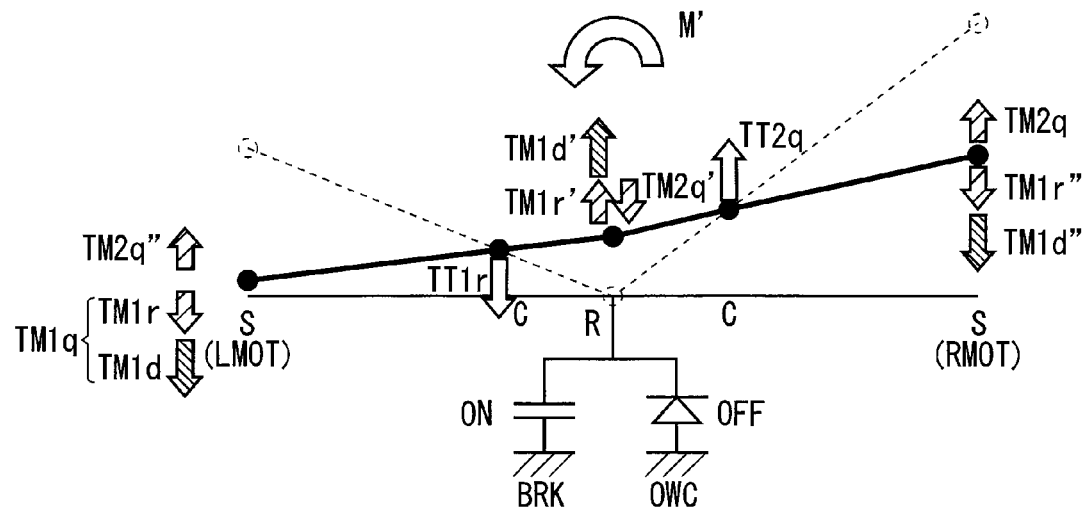
FIG. 12A is a speed alignment chart for the rear wheel drive unit during ring-free electric power priority control.
Figure 12B:
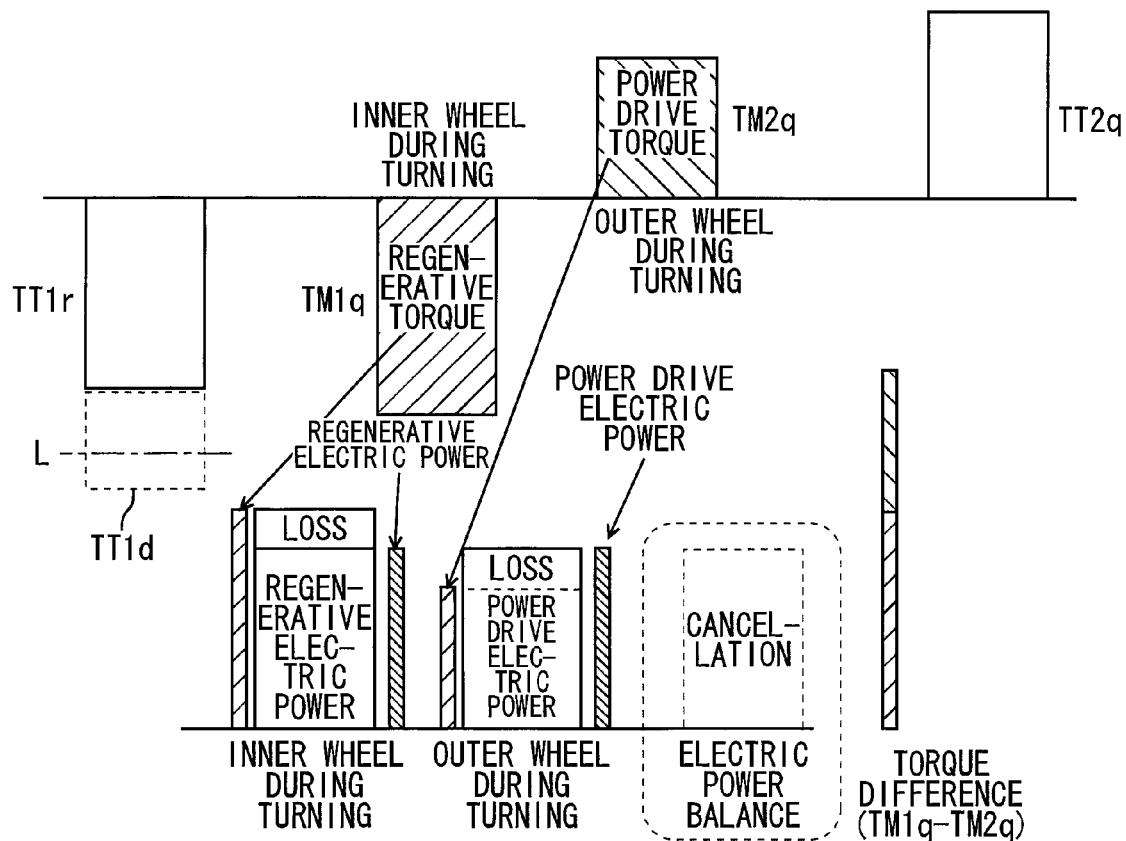
FIG. 12B is a view illustrating a torque balance and an electric power balance during the control.

In other words, the left rear wheel torque TT1$r$ of the left rear wheel torque TT1$q$, balanced with the right rear wheel torque TT2$q$, is transmitted to the left and right rear wheels LWr and RWr as described above. However, the remaining torque TT1$d$ (=TT1$q$–TT1$r$) is consumed by the changes in the rotation speeds of the first and second electric motors 2A and 2B and the ring gears 24A and 24B. On the other hand, the first motor torque TM1$q$ can be divided into a first motor torque TM1$r$ (a torque obtained by dividing the left rear wheel torque TT1$r$ by the reduction ratio of the first planetary gear reducer 12A) in the reverse direction, corresponding to the left rear wheel torque TT1$r$, and a rotation speed change torque TM1$d$ (a torque obtained by dividing the left rear wheel torque TT1$d$ by the reduction ratio of the first planetary gear reducer 12A) in the reverse direction serving as the remaining torque of the torque TM1$q$. The ring-free electric power priority control is described below more specifically. As shown in FIG. 12A, when the hydraulic brakes 60A and 60B are released and the state is switched from the ring-locking state to the ring-free state while the motor torques are generated in the first and second electric motors 2A and 2B (that is, while the sun gears 21A and 21B are used as power points), the fulcrum is shifted from the ring gears 24A and 24B to the planetary carriers 23A and 23B and the application points are shifted from the planetary carriers 23A and 23B to the ring gears 24A and 24B in the first and second planetary gear reducers 12A and 12B.

By virtue of the first motor torque TM1$q$ (=the first motor torque TM1$r$+the rotation speed change torque TM1$d$) of the first electric motor 2A, in the first planetary gear reducer 12A, the planetary carrier 23A serves as a fulcrum, and the first motor torque TM1$r$ and the rotation speed change torque TM1$d$ in the reverse direction are exerted to the sun gear 21A serving as a power point, whereby a first motor torque distribution force TM1$r'$ and a rotation speed change torque distribution force TM1$d'$ in the forward direction are exerted to the ring gears 24A and 24B serving as an application point. In addition, in the second planetary gear reducer 12B, the planetary carrier 23B serves as a fulcrum, and the first motor torque distribution force TM1$r'$ and the rotation speed change torque distribution force TM1$d'$ in the forward direction are exerted to the ring gears 24A and 24B serving as a power point, whereby a first motor torque distribution force TM1$r''$ and a rotation speed change torque distribution force TM1$d''$ in the reverse direction are exerted to the sun gear 21B serving as an application point.

On the other hand, by virtue of the second motor torque TM2$q$ of the second electric motor 2B, in the second planetary gear reducer 12B, the planetary carrier 23B serves as a fulcrum, and the second motor torque TM2$q$ in the forward direction is exerted to the sun gear 21B serving as a power point, whereby a second motor torque distribution force TM2$q'$ in the reverse direction is exerted to the ring gears 24A and 24B serving as an application point. In addition, in the first planetary gear reducer 12A, the planetary carrier 23A serves as a fulcrum, and the second motor torque distribution force TM2$q'$ in the reverse direction is exerted to the ring gears 24A and 24B serving as a power point, whereby a second motor torque distribution force TM2$q''$ in the forward direction is exerted to the sun gear 21A serving as an application point.

Since the first motor torque TM1$r$ and the second motor torque TM2$q$ are equal (in absolute value) but opposite in direction, the first motor torque TM1$r$ in the reverse direction and the second motor torque distribution force TM2$q''$ in the forward direction exerted to the sun gear 21A are cancelled with each other. Furthermore, the first motor torque distribution force TM1$f$ in the forward direction and the second motor base torque distribution force TM2$q'$ in the reverse direction exerted to the ring gears 24A and 24B are cancelled with each other, and the first motor torque distribution force TM1$r''$ in the reverse direction and the second motor torque TM2$q$ in the forward direction exerted to the sun gear 21B are cancelled with each other. Hence, by virtue of the first motor torque TM1$r$ and the second motor torque TM2$q$, the sun gears 21A and 21B and the ring gears 24A and 24B are balanced so that their rotation states are maintained. At this time, the left rear wheel torque TT1$r$ in the reverse direction obtained by multiplying the reduction ratio of the first planetary gear reducer 12A to the above-mentioned first motor torque TM1$r$ is exerted to the planetary carrier 23A, and the right rear wheel torque TT2$q$ in the reverse direction obtained by multiplying the reduction ratio of the first planetary gear reducer 12B to the second motor torque TM2$q$ is exerted to the planetary carrier 23B.

Since the reduction ratios of the first and second planetary gear reducers 12A and 12B are equal to each other, the counterclockwise yaw moment M' is generated by the left and right rear wheel torques TT1$r$ and TT2$q$.

On the other hand, since the rotation speed change torque TM1$d$ and the distribution forces thereof, that is, the rotation speed change torque distribution force TM1$d'$ and the rotation speed change torque distribution force TM1$d''$, have no torques to be balanced therewith, the torques are not output to the planetary carriers 23A and 23B but consumed for the changes in the rotation speeds of the sun gears 21A and 21B and the ring gears 24A and 24B. Accordingly, the rotation speed change torque TM1$d$ of the first motor torque TM1$q$ in the reverse direction exerted to the sun gear 21A and the rotation speed change torque distribution force TM1$d''$ in the reverse direction serving as the distribution force thereof and exerted to the sun gear 21B decrease the rotation speeds of the sun gears 21A and 21B, that is, the rotation speeds of the first and second electric motors 2A and 2B, respectively. Furthermore, the rotation speed change torque distribution force TM1$d'$ in the forward direction exerted to the ring gears 24A and 24B increases the rotation speed of the ring gears 24A and 24B.

Hence, the ring-free electric power priority control can be performed until the first and second electric motors 2A and 2B stop or until the rotation speed of the ring gears 24A and 24B reaches a predetermined threshold value. Hence, the controller 8 obtains the rotation speeds of the first and second electric motors 2A and 2B from the resolvers 20A and 20B, and when the rotation speeds of the first and second electric motors 2A and 2B are equal to or less than the predetermined value, the controller 8 stops the ring-free electric power priority control or obtains the rotation speed of the ring gears 24A and 24B from, for example, rotation detector, not shown. When the rotation speed of the ring gears 24A and 24B is more than the predetermined value, the controller 8 stops the ring-free electric power priority control. As a result, the controller 8 can perform control in an appropriate range while suppressing the ring gears 24A and 24B from rotating at over speed. The term "obtaining" includes a meaning of detection and estimation and also includes calculation of a target rotation speed based on a rotation speed related thereto. In addition, it may be possible to obtain the rotation speeds of the sun gears 21A and 21B, instead of obtaining the rotation speeds of the first and second electric motors 2A and 2B.

Since the control of the first and second electric motors 2A and 2B during the ring-locking electric power priority control is maintained in the ring-free electric power priority control shown in FIG. 12A, the motor torque difference between the first and second motor torques TM1$q$ and TM2$q$ remains unengaged, and the electric power balance at this time is such that the regenerative electric power generated in the first electric motor 2A is balanced with the power drive electric power consumed by the second electric motor 2B and such that the supply and reception of electric power is not performed between the battery 9 or the electric motor 5 of the front wheel drive unit 6 and the first and second electric motors 2A and 2B.

Figure 13:
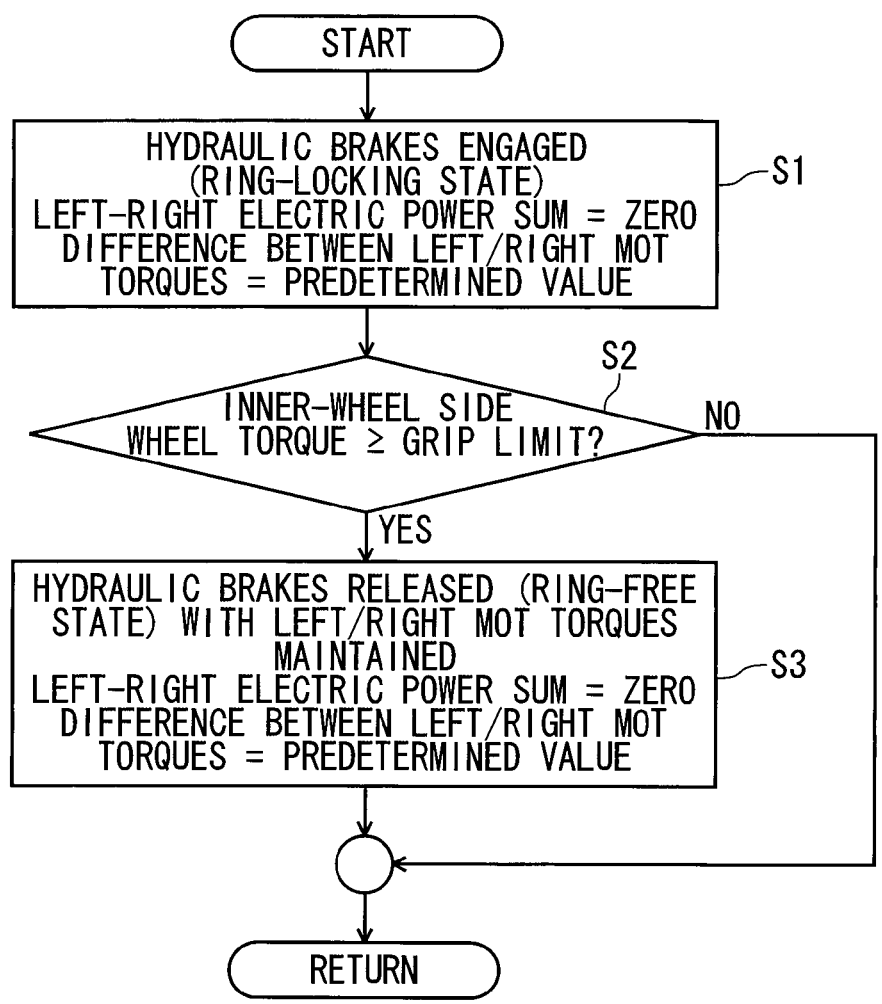
FIG. 13 is a flow chart illustrating a flow at the time when the control is switched from the ring-locking electric power priority control to the ring-free electric power priority control.
Figure 14:
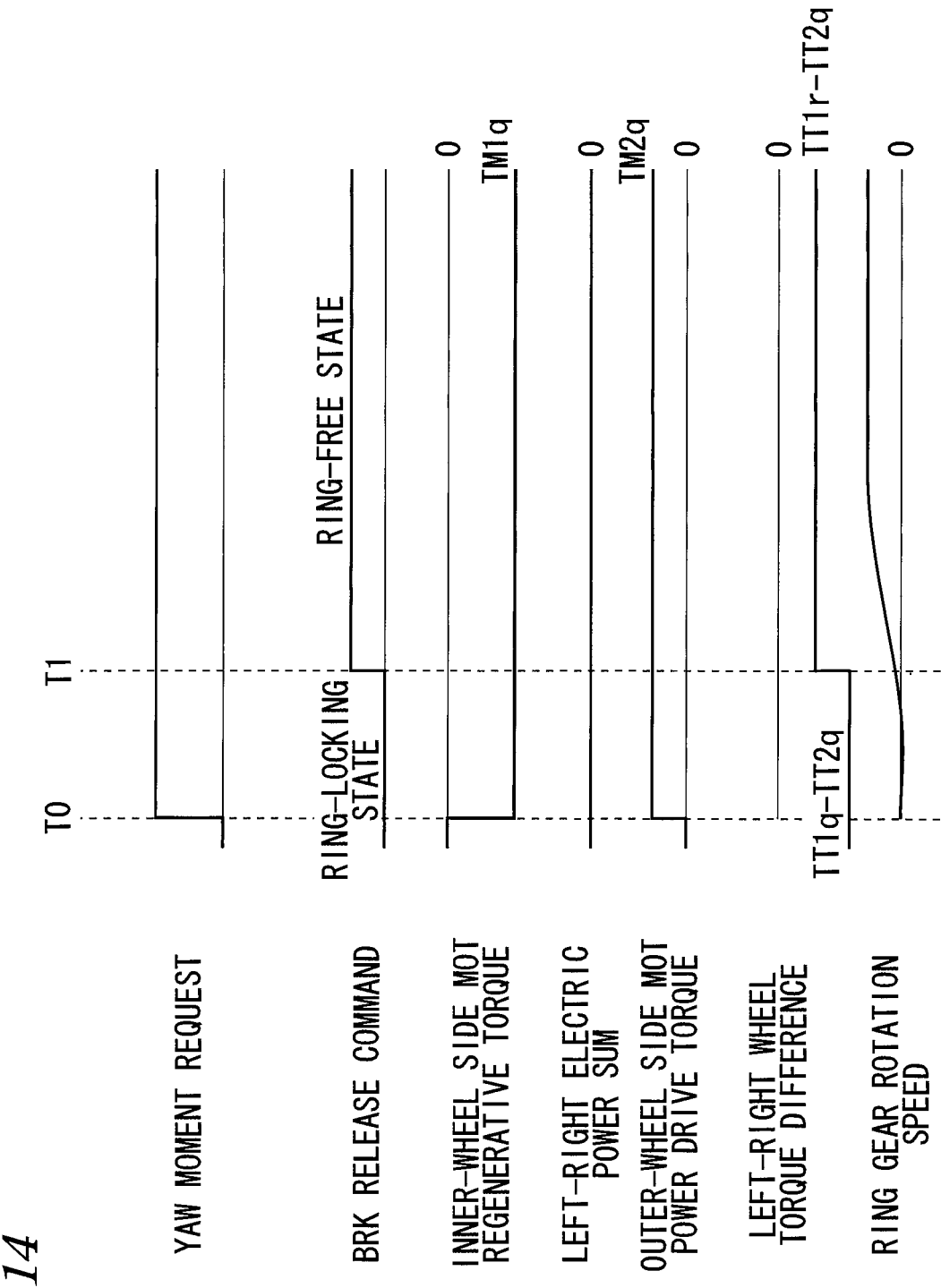
FIG. 14 is a timing chart at the time when the control is switched from the ring-locking electric power priority control to the ring-free electric power priority control.

FIG. 13 is a flow chart illustrating the switching from the ring-locking electric power priority control to the ring-free electric power priority control, and FIG. 14 is a timing chart at the time when the switching is performed from the ring-locking electric power priority control to the ring-free electric power priority control.

The switching from the ring-locking electric power priority control shown in FIG. 11 to the ring-free electric power priority control shown in FIG. 12 is taken as an example and described below. When a counterclockwise yaw moment request is input at time T0 during the forward middle-speed travel of the vehicle, the first motor torque TM1$q$ is generated as an inner-wheel side MOT regenerative torque in the first electric motor 2A on the inner wheel side, and the second motor torque TM2$q$ is generated as an outer-wheel side MOT power drive torque in the second electric motor 2B on the outer wheel side. In the ring-locking electric power priority control, the hydraulic brakes 60A and 60B are engaged and the left-right electric power sum is zero. Hence, the torque difference (TT1$q$−TT2$q$) is generated between the left and right rear wheel torques TT1$q$ and TT2$q$, and the yaw moment M is generated depending on the torque difference (at S1).

Then, the left rear wheel torque TT1$q$ serving as the inner-wheel side wheel torque is compared with the inner wheel grip limit threshold value L (at S2). In the case that the left rear wheel torque TT1$q$ serving as the inner-wheel side wheel torque is less than the inner wheel grip limit threshold value L, the processing is ended. In the case that the left rear wheel torque TT1$q$ serving as the inner-wheel side wheel torque is equal to or more than the inner wheel grip limit threshold value L, the hydraulic brakes 60A and 60B are released while the first and second motor torques TM1$q$ and TM2$q$ of the first and second electric motors 2A and 2B are maintained (at S3). Since the first and second motor torques TM1$q$ and TM2$q$ of the first and second electric motors 2A and 2B are maintained as described above, the predetermined motor torque difference is maintained between the first and second electric motors 2A and 2B, and the left-right electric power sum is also maintained. On the other hand, the torque difference (TT1$q$−TT2$q$) between the left and right rear wheel torques TT1$q$ and TT2$q$ is decreased to the torque difference (TT1$r$−TT2$q$), and the yaw moment M is also decreased to the yaw moment M' in response to the decreased torque difference.

As described above, in the case that the left rear wheel torque TT1$q$ serving as the inner-wheel side wheel torque is equal to or more than the inner wheel grip limit threshold value L, the control is switched from the ring-locking electric power priority control to the ring-free electric power priority control, whereby the period in which the left-right electric power sum is zero can be maintained longer while slip generation is suppressed. Furthermore, since the first and second motor torques TM1$q$ and TM2$q$ are maintained in the zero state of the left-right electric power sum, the predetermined motor torque difference is maintained between the first and second electric motors 2A and 2B, whereby the yaw moment M' due to the motor torque difference can be suppressed from changing.

In the above-mentioned embodiment, when the left rear wheel torque TT1$q$ becomes more than the inner wheel grip limit threshold value L, the hydraulic brakes 60A and 60B are released, and the control is switched to the ring-free electric power priority control. However, when it is predicted that the left rear wheel torque TT1$q$ becomes more than the inner wheel grip limit threshold value L, it may be possible that the hydraulic brakes 60A and 60B are released and the control is switched to the ring-free electric power priority control. Furthermore, slip may be predicted by using the left rear wheel drive power as a parameter, instead of using the left rear wheel torque TT1$q$.

Moreover, in the above-mentioned embodiment, the left rear wheel torque TT1$q$ serving as the inner-wheel side wheel torque is compared with the inner wheel grip limit threshold value L at step S2. However, it may be possible that the first motor torque TM1$q$ serving as the inner-wheel side MOT regenerative torque is compared with a conversion value of the inner-wheel grip limit threshold value obtained by converting the inner wheel grip limit threshold value L to the limit threshold value at the installation position of the first electric motor 2A serving as the electric motor on the inner wheel side.

What's more, in the above-mentioned embodiment, the first and second electric motors 2A and 2B are controlled so that the electric power balance becomes zero (including nearly zero) in the ring-locking electric power priority control and the ring-free electric power priority control. However, the control may be performed so that the electric power balance becomes a constant value, instead of being limited to zero. This makes it possible to suppress the load fluctuations at the battery 9 for supplying electric power to the first and second electric motors 2A and 2B and at the electric motor 5 of the front wheel drive unit 6.

Still further, in the above-mentioned embodiment, an example is described in which the control is switched from the ring-locking electric power priority control to the ring-free electric power priority control. However, without being limited to this, the ring-free electric power priority control may be performed from the state in which the first and second electric motors 2A and 2B are not driven.

As described above, when the state is switched from the ring-locking state to the ring-free state during the ring-locking electric power priority control, the control is switched from the ring-locking electric power priority control to the ring-free electric power priority control based on the left-right electric power sum. This makes it possible to suppress the load fluctuations at the battery 9 for supplying electric power to the first and second electric motors 2A and 2B and at the electric motor 5 of the front wheel drive unit 6. In addition, since the first and second electric motors 2A and 2B are controlled so that the left-right electric power sum becomes zero, torques can be transmitted to the left and right rear wheels LWr and RWr even in a state in which the function of the electric power source is more degraded than usual, for example, because of extremely-low temperature or due to problems in the electric power source.

Furthermore, in the case that a torque or a drive force being equal to or more than the grip limit is generated or predicted to be generated in the inner wheel, the control is switched from the ring-locking electric power priority control to the ring-free electric power priority control, whereby the period in which the left-right electric power sum is zero can be maintained longer while slip generation is suppressed.

The present invention is not limited to the above-mentioned embodiment but can be modified, improved, etc. appropriately.

For example, the hydraulic brakes 60A and 60B are not required to be provided for the ring gears 24A and 24B, respectively. At least one hydraulic brake should only be provided for the connected ring gears 24A and 24B, and the one-way clutch is not necessarily required to be provided. In this case, the state can be changed from the ring-locking state to the ring-free state by controlling the hydraulic brake so that its state is changed from its released state to its engaged state.

In addition, although the hydraulic brake is taken as an example of the rotation restrictor, without being limited to this type, a mechanical type, an electromagnetic type, etc. can be selected as desired.

Furthermore, although the first and second electric motors 2A and 2B are connected to the sun gears 21A and 21B and the ring gears are connected to each other, without being limited to this configuration, the sun gears may be connected to each other, and the first and second electric motors 2A and 2B may be connected to the ring gears.

Moreover, the front wheel drive unit may be driven by using an electric motor as only one drive source, without using the internal combustion engine.

Still further, although rotation speed (r/min) is used as a rotation state amount in the above-mentioned embodiment, other rotation state amounts, such as angular velocity (rad/s), may also be used without being limited to the rotation speed (r/min). Similarly, instead of motor torque (N·m), motor current (A), motor drive power, etc. relating to motor torque may also be used.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A vehicle drive device comprising:
    a left electric motor-generator connected to a left wheel of a vehicle;
    a left speed changer disposed on a power transmission path between the left wheel and the left electric motor-generator;
    a right electric motor-generator connected to a right wheel of the vehicle;
    a right speed changer disposed on a power transmission path between the right wheel and the right electric motor-generator; and
    an electric motor-generator controller configured to control the left electric motor-generator and the right electric motor-generator,
    wherein each of the left speed changer and the right speed changer comprises first to third rotation elements,
    the left electric motor-generator is connected to the first rotation element of the left speed changer,
    the right electric motor-generator is connected to the first rotation element of the right speed changer,
    the left wheel is connected to the second rotation element of the left speed changer, the right wheel is connected to the second rotation element of the right speed changer, and
    the third rotation element of the left speed changer and the third rotation element of the right speed changer are connected to each other,
    the vehicle drive device further comprises:
    a rotation restrictor switched to be in a released state or in a locked state and configured to restrict rotations of the third rotation elements in the locked state; and
    a rotation restrictor controller configured to control the rotation restrictor,
    wherein the electric motor-generator controller is configured to control a left electric power of the left electric motor-generator and a right electric power of the right electric motor-generator, based on the sum of the left electric power and the right electric power, wherein the left electric power is defined as an electric power generated or consumed by the left electric motor-generator, and the right electric power is defined as an electric power generated or consumed by the right electric motor-generator, and
    wherein the electric motor-generator controller controls the left electric power of the left electric motor-generator and the right electric power of the right electric motor-generator such that the sum of the left electric power and the right electric power becomes a constant value, when the rotation restrictor controller controls the rotation restrictor such that the rotation restrictor is in the released state.

2. The vehicle drive device of claim 1,
    wherein the electric motor-generator controller is further configured to control a first difference between a torque of the left electric motor-generator and a torque of the right electric motor-generator or a second difference between a drive power of the left electric motor-generator and a drive power of the right electric motor-generator, and
    wherein the electric motor-generator controller controls the first difference or the second difference such that the first difference or the second difference becomes a constant value,
    when the rotation restrictor controller controls the rotation restrictor such that the rotation restrictor is in the released state.

3. The vehicle drive device of claim 1, further comprising;
    a third rotation element state amount obtaining unit configured to obtain a rotation state amount of the third rotation elements,
    wherein the electric motor-generator controller stops controlling the left electric power of the left electric motor-generator and the right electric power of the right electric motor-generator, when the rotation state amount of the third rotation elements is equal to or more than a predetermined value.

4. The vehicle drive device of claim 1, further comprising:
    a rotation state amount obtaining unit configured to obtain a rotation state amount of the left electric motor-generator, the first rotation element of the left speed changer, the right electric motor-generator or the first rotation element of the right speed changer, and
    wherein the electric motor-generator controller stops controlling the left electric power of the left electric motor-generator and the right electric power of the right electric motor-generator,
    when the rotation state amount obtained by the rotation state amount obtaining unit is equal to or more than a predetermined value.

5. The vehicle drive device of claim 1, wherein the constant value is substantially zero.

6. A vehicle drive device comprising:
    a left electric motor-generator connected to a left wheel of a vehicle;
    a left speed changer disposed on a power transmission path between the left wheel and the left electric motor-generator;
    a right electric motor-generator connected to a right wheel of the vehicle;
    a right speed changer disposed on a power transmission path between the right wheel and the right electric motor-generator; and
    an electric motor-generator controller configured to control the left electric motor-generator and the right electric motor-generator,
    wherein each of the left speed changer and the right speed changer comprises first to third rotation elements,
    the left electric motor-generator is connected to the first rotation element of the left speed changer,
    the right electric motor-generator is connected to the first rotation element of the right speed changer, the left wheel is connected to the second rotation element of the left speed changer, the right wheel is connected to the second rotation element of the right speed changer, and the third rotation element of the left speed changer and the third rotation element of the right speed changer are connected to each other, the vehicle drive device further comprises:

a rotation restrictor switched to be in a released state or in a locked state and configured to restrict rotations of the third rotation elements in the locked state; and a rotation restrictor controller configured to control the rotation restrictor, wherein the electric motor-generator controller is configured to control a left electric power of the left electric motor-generator and a right electric power of the right electric motor-generator, based on the sum of the left electric power and the right electric power, wherein the left electric power is defined as an electric power generated or consumed by the left electric motor-generator, and the right electric power is defined as an electric power generated or consumed by the right electric motor-generator, wherein the electric motor-generator controller is further configured to control a first difference between a torque of the left electric motor-generator and a torque of the right electric motor-generator or a second difference between a drive power of the left electric motor-generator and a drive power of the right electric motor-generator, wherein in a state where the rotation restrictor controller controls the rotation restrictor such that the rotation restrictor is in the locked state, and the electric motor-generator controller controls the left electric power of the left electric motor-generator and the right electric power of the right electric motor-generator such that the sum of the left electric power and the right electric power is substantially zero while controlling the first difference or the second difference such that the first difference or the second difference becomes a constant value, when a torque or a drive power being equal to or more than a grip limit is generated or predicted to be generated at either the left wheel or the right wheel, the rotation restrictor controller controls the rotation restrictor such that the rotation restrictor is switched from the locked state to the released state, and the electric motor-generator controller controls the left electric power of the left electric motor-generator and the right electric power of the right electric motor-generator such that the sum of the left electric power and the right electric power maintains substantially zero while controlling the first difference or the second difference such that the first difference or the second difference maintains the constant value.

7. The vehicle drive device of claim 2, further comprising;

a third rotation element state amount obtaining unit configured to obtain a rotation state amount of the third rotation elements, wherein the electric motor-generator controller stops controlling the left electric power of the left electric motor-generator and the right electric power of the right electric motor-generator, when the rotation state amount of the third rotation elements is equal to or more than a predetermined value.

8. The vehicle drive device of claim 2, further comprising:

a rotation state amount obtaining unit configured to obtain a rotation state amount of the left electric motor-generator, the first rotation element of the left speed changer, the right electric motor-generator or the first rotation element of the right speed changer, and wherein the electric motor-generator controller stops controlling the left electric power of the left electric motor-generator and the right electric power of the right electric motor-generator, when the rotation state amount obtained by the rotation state amount obtaining unit is equal to or more than a predetermined value.

9. The vehicle drive device of claim 1, wherein, when the rotation restrictor controller controls the rotation restrictor such that the rotation restrictor is in the released state, the third rotation element of the left speed changer and the third rotation element of the right speed changer are connected to each other such that left and right torques equal to each other in an absolute value but opposite to each other in a direction can be transmitted to the left and right wheels, respectively.

10. The vehicle drive device of claim 6, wherein, when the rotation restrictor controller controls the rotation restrictor such that the rotation restrictor is in the released state, the third rotation element of the left speed changer and the third rotation element of the right speed changer are connected to each other such that left and right torques equal to each other in an absolute value but opposite to each other in a direction can be transmitted to the left and right wheels, respectively.

* * * * *